US012582918B2

(12) United States Patent
Harper et al.

(10) Patent No.: US 12,582,918 B2
(45) Date of Patent: Mar. 24, 2026

(54) SLIDE AND RIDE SYSTEM

(71) Applicant: KHE Limited, Christchurch (NZ)

(72) Inventors: Gordon William Harper, Christchurch (NZ); Jonathan Richard Baxter, Christchurch (NZ)

(73) Assignee: KHE LIMITED, NEXIA CHRISTCHURCH LIMITED, Christchurch (NZ)

( * ) Notice: Subject to any disclaimer, the term of this patent is extended or adjusted under 35 U.S.C. 154(b) by 137 days.

(21) Appl. No.: 18/501,081

(22) Filed: Nov. 3, 2023

(65) Prior Publication Data

US 2025/0114713 A1     Apr. 10, 2025

(30) Foreign Application Priority Data

Oct. 10, 2023     (AU) ................................. 2023903248

(51) Int. Cl.
A63G 21/18          (2006.01)
F21S 4/28            (2016.01)
(Continued)

(52) U.S. Cl.
CPC .............. *A63G 21/18* (2013.01); *F21S 4/28* (2016.01); *G03B 21/16* (2013.01); *G03B 29/00* (2013.01);
(Continued)

(58) Field of Classification Search
CPC ...................................................... A63G 21/18
(Continued)

(56) References Cited

U.S. PATENT DOCUMENTS 7,008,329 B2 *   3/2006   Hunter ................... A63G 21/18
                                                                                    472/117
7,520,628 B1 *   4/2009   Sloan ...................... F21V 29/85
                                                                                    362/373

(Continued)

FOREIGN PATENT DOCUMENTS

WO          2018169405 A1      9/2018

OTHER PUBLICATIONS

International-type Search Report issued from the Australian Patent Office on Nov. 30, 2023, in connection with the related AU Application No. 2023903248.

*Primary Examiner* — Joseph A Dillon, Jr.
(74) *Attorney, Agent, or Firm* — Godfrey & Kahn, S.C.; Christopher M. Scherer

(57)          ABSTRACT

A slide and ride system are described. A slide is described with a processor comprising ride prediction software configured to use inputs on the rider and slide to predict ride output factors including rider position and speed and to use the predicted one or more ride output factors to direct and adjust an image displayed on the slide interior corresponding to rider speed and position on the slide. The projector used may be configured to display an image on at least part of the slide interior, the image corrected to appear flat when projected by the projector onto the slide interior surface.
The slide may also comprise at least one LED strip lighting loop, each loop configured to fit around a slide exterior and project LED light into the slide interior, or LED spot lights configured to spot light the slide interior, the or each LED spot light comprising a prefabricated assembly configured to be fitted to a ring cut into the slide wall, or optionally roof, from the slide interior.

20 Claims, 18 Drawing Sheets

(51) Int. Cl.

| | |
|---|---|
| *G03B 21/16* | (2006.01) |
| *G03B 29/00* | (2021.01) |
| *G06F 3/01* | (2006.01) |
| *F21Y 115/10* | (2016.01) |
| *H04N 9/31* | (2006.01) |

(52) U.S. Cl.
   CPC ........... *G06F 3/011* (2013.01); *F21Y 2115/10*
   (2016.08); *H04N 9/3147* (2013.01)

(58) Field of Classification Search
   USPC ....................................................... 472/117
   See application file for complete search history.

(56) References Cited

U.S. PATENT DOCUMENTS

| | | | | |
|---|---|---|---|---|
| 8,375,864 | B1 * | 2/2013 | Crawford ................. | A63G 3/02 |
| | | | | 104/73 |
| 9,592,454 | B2 * | 3/2017 | Weston ................... | A63G 21/18 |
| 10,528,123 | B2 * | 1/2020 | McCracken .......... | G06T 19/006 |
| 10,782,525 | B2 * | 9/2020 | Greenwood .......... | H04L 67/131 |
| 10,807,531 | B2 * | 10/2020 | Bruno ...................... | G06F 3/012 |
| 11,040,290 | B2 * | 6/2021 | Zavesky ................. | G06F 3/016 |
| 11,132,839 | B1 * | 9/2021 | White .................... | G06T 19/006 |
| 11,262,583 | B2 * | 3/2022 | Greenwood .......... | G06T 19/006 |
| 11,487,349 | B2 * | 11/2022 | Briggs ................... | A63G 33/00 |
| 11,779,851 | B2 * | 10/2023 | Vance .................. | A63G 31/007 |
| | | | | 472/128 |
| 11,960,637 | B2 * | 4/2024 | Mendelson ............ | A63G 21/18 |
| 12,182,949 | B2 * | 12/2024 | Melo ...................... | A63G 31/16 |
| 2006/0187652 | A1 * | 8/2006 | Doyle ..................... | F21V 23/02 |
| | | | | 362/101 |
| 2009/0143155 | A1 | 6/2009 | Werner | |
| 2013/0175569 | A1 * | 7/2013 | Asseraf ..................... | F21S 8/00 |
| | | | | 257/99 |
| 2015/0133229 | A1 * | 5/2015 | Weston .................. | A63G 21/18 |
| | | | | 472/117 |
| 2019/0094540 | A1 * | 3/2019 | Greenwood .......... | H04L 67/131 |
| 2019/0176026 | A1 * | 6/2019 | Briggs ................. | A63G 31/007 |
| 2020/0016500 | A1 * | 1/2020 | Cortelyou .......... | A63B 71/0622 |
| 2020/0108324 | A1 * | 4/2020 | Bloomfield .............. | A63G 1/24 |
| 2022/0253127 | A1 | 8/2022 | Briggs et al. | |
| 2023/0057268 | A1 * | 2/2023 | Hunter ................... | A63G 21/18 |
| 2023/0113886 | A1 | 4/2023 | Jenson et al. | |
| 2024/0345653 | A1 * | 10/2024 | Mendelson ............ | G06F 3/011 |
| 2024/0385501 | A1 * | 11/2024 | Mecca .................... | A63J 5/021 |
| 2025/0090968 | A1 * | 3/2025 | Lechevalier .......... | A63G 21/18 |

\* cited by examiner

80

90

SLIDE AND RIDE SYSTEM

RELATED APPLICATIONS

This application derives priority from Australia patent application number 2023903248 filed on 10 Oct. 2023 with WIPO DAS code 9AE4 incorporated herein by reference.

TECHNICAL FIELD

Described herein is a slide and ride system. More specifically, slides are described using rider tracking and characteristics to control imagery that a slide rider views as they travel along the slide. A slide using projectors to project images onto the slide interior is also described. A ride system is described incorporating the above. Further slide variations are also described using LED loops and spot lighting.

BACKGROUND ART

Slides are widely used for leisure globally. Providing an immersive effect for the rider of a slide may be of benefit to the ride retailer and provide a point of difference. Provision of immersive effects in a slide does however, provide a number of challenges.

For example, to achieve a sense of movement and immersion, the images displayed on the slide interior may desirably change in reference and perspective as the rider moves down the slide. Ideally, this is achieved from the rider's perspective to create the sense of illusion of immersion in the displayed imagery.

The step of projecting an image onto the slide interior may also be challenging. Traditionally, a projected image is displayed on a flat 2-dimensional surface. A slide however, is typically circular in shape and there are no flat 2-dimensional surfaces on which to project an image. For maximum effect, projection must therefore adapt an image to look 3-dimensional on the circular slide interior.

A further complication is that of having to locate image projectors in challenging environments exposed to the environment, heat, water, dust, corrosive sea air in sea environments, and integrated temperature regulation needed by the projectors. Given that slides generally comprise a vertical fall, the location of projectors may be at height and not easily accessible hence, reliability and low maintenance requirements may be essential to commercial success.

Other effects such as LED lighting may also be desirable but need to not interfere with the slide interior ride surface. It may further be an advantage to be able to access LED lighting from the slide interior for servicing and installation.

To provide an effective LED lighting effect, it is also necessary to house the LED's in a manner that ensures that the heat generated by the LED units as well as the heat from the sun do not compromise the operation of the LED's. The LED housing must also be designed to ensure that ambient light from the sun or surrounding lighting does not enter the area of the LED's. The LED's must also be held a suitable distance from the translucent area of the slide surface to ensure an appropriate lighting effect.

It may be useful to address some or all of the above challenges or at least provide the public with a choice.

Further aspects and advantages of the slide and ride system will become apparent from the ensuing description that is given by way of example only.

SUMMARY

A slide and ride system are described. The slides comprise visual ride enhancement features and items that allow for the visual ride enhancement along with a ride system comprises the slide and features.

In a first aspect, there is provided a slide comprising a base, walls and optionally, a roof, along with a slide interior and slide exterior, the slide having an entrance, an ending and an intermediate section between the entrance and the ending on which a rider slides and water passing over the slide base and slide walls to urge rider movement from the entrance, through the intermediate section and to the ending of the slide; and a processor comprising ride prediction software configured to:

use inputs selected from at least one or more of: rider weight, rider height, rider to slide friction, water impact factor, slide geometry, and water flow; and from the inputs, predict ride output factors comprising one or more of: drag force, friction force, resultant force imposed on the rider during the ride, and rider position on the slide base over time during the ride; and use the predicted one or more ride output factors to direct and adjust an image displayed on the slide interior corresponding to rider speed and position on the slide.

In a second aspect, there is provided a slide comprising a base, walls and optionally, a roof, along with a slide interior and slide exterior, the slide having an entrance, an ending and an intermediate section between the entrance and the ending on which a rider slides and water passing over the slide base and slide walls to urge rider movement from the entrance, through the intermediate section and to the ending of the slide; and a projector configured to display an image on at least part of the slide interior, the image corrected to appear flat when projected by the projector onto the slide interior surface.

In a third aspect, there is provided a ride experience comprising:

a slide comprising a base, walls and optionally, a roof, along with a slide interior and slide exterior, the slide having an entrance, an ending and an intermediate section between the entrance and the ending on which a rider slides and water passing over the slide base and slide walls to urge rider movement from the entrance, through the intermediate section and to the ending of the slide; and a processor comprising ride prediction software configured to:

use inputs selected from at least one or more of: rider weight, rider height, rider to slide friction, water impact factor, slide geometry, and water flow; and from the inputs, predict ride output factors comprising one or more of: drag force, friction force, resultant force imposed on the rider during the ride, and rider position on the slide base over time during the ride; and use the predicted one or more ride output factors to direct and adjust an image displayed by at least one projector on the slide interior corresponding to rider speed and position on the slide; and/or wherein the at least one projector is configured to display an image on at least part of the slide interior, the image corrected to appear flat when projected by the at least one projector onto the slide interior surface.

In a fourth aspect, there is provided a slide comprising a base, walls and optionally, a roof, along with a slide interior and slide exterior, the slide having an entrance, an ending and an intermediate section between the entrance and the ending on which a rider slides and water passing over the slide base and slide walls to urge rider movement from the entrance, through the intermediate section and to the ending of the slide; and at least one LED strip lighting loop, each loop configured to fit around a slide exterior and project LED light into the slide interior.

In a fifth aspect, there is provided a slide comprising a base, walls and optionally, a roof, along with a slide interior and slide exterior, the slide having an entrance, an ending and an intermediate section between the entrance and the ending on which a rider slides and water passing over the slide base and slide walls to urge rider movement from the entrance, through the intermediate section and to the ending of the slide; and LED spot lights configured to spot light the slide interior, the or each LED spot light comprising a prefabricated assembly configured to be fitted to a ring cut into the slide wall, or optionally roof, from the slide interior.

The slide and ride system described above may provide a number of advantages such as, but not limited to: provision of the rider with a sense of movement and immersion; image change in reference and perspective as the rider moves down the slide; image movement achieved from the rider's perspective to create the sense of illusion of immersion in the displayed imagery; image projection that adapts an image to look 3-dimensional on the circular slide interior.

BRIEF DESCRIPTION OF THE DRAWINGS

Further aspects of the slide and ride system will become apparent from the following description that is given by way of example only and with reference to the accompanying drawings in which.

DETAILED DESCRIPTION

Figure 1:
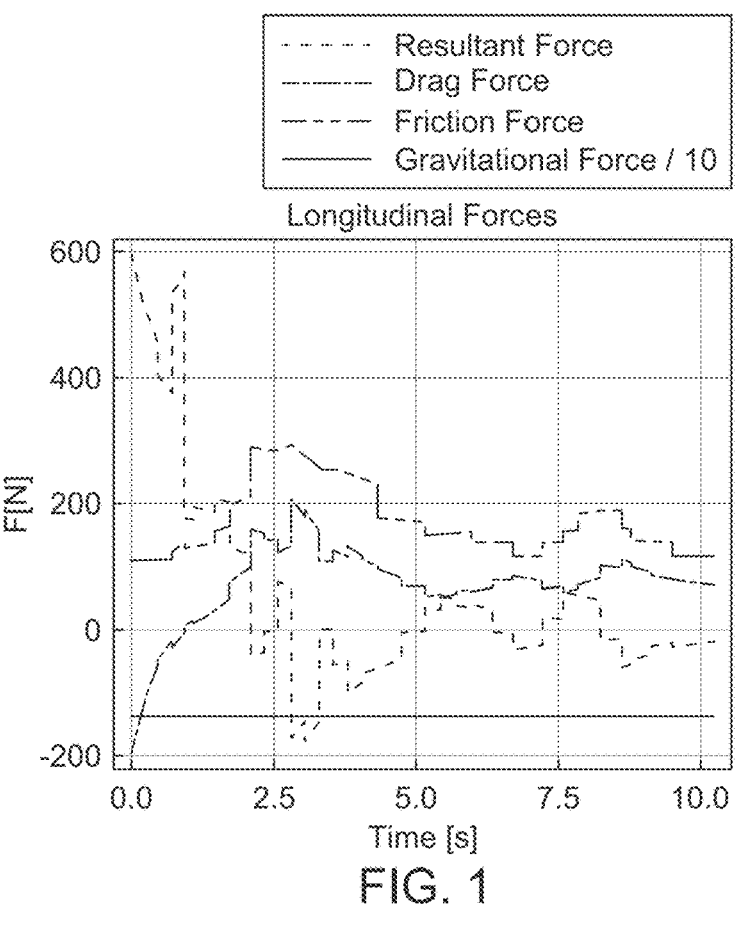
FIG. 1 shows a typical output graph illustrating the predicted forces, rider position, rider speed, based on time/location on the slide.

As noted above, a slide and ride system are described. The slides comprise visual ride enhancement features and items that allow for the visual ride enhancement along with a ride system comprises the slide and features.

For the purposes of this specification, the term 'about' or 'approximately' or 'substantially' and grammatical variations thereof mean a quantity, level, degree, value, number, frequency, percentage, dimension, size, amount, weight or length that varies by as much as 30, 25, 20, 15, 10, 9, 8, 7, 6, 5, 4, 3, 2, or 1% to a reference quantity, level, degree, value, number, frequency, percentage, dimension, size, amount, weight or length.

The term 'comprise' and grammatical variations thereof shall have an inclusive meaning—i.e. that it will be taken to mean an inclusion of not only the listed components it directly references, but also other non-specified components or elements.

The term 'slide' or grammatical variations thereof may be used interchangeably with the terms water slide or hydro slide, referring collectively to a slide that a person (rider) or object may slide down with or without the use of water or sliding craft on which the rider lies or sits upon.

Slide and Rider Position Prediction and Image Generation

In a first aspect, there is provided a slide comprising a base, walls and optionally, a roof, along with a slide interior and slide exterior, the slide having an entrance, an ending and an intermediate section between the entrance and the ending on which a rider slides and water passing over the slide base and slide walls to urge rider movement from the entrance, through the intermediate section and to the ending of the slide; and a processor comprising ride prediction software configured to:

use inputs selected from at least one or more of: rider weight, rider height, rider to slide friction, water impact factor, slide geometry, and water flow; and from the inputs, predict ride output factors comprising one or more of: drag force, friction force, resultant force imposed on the rider during the ride, and rider position on the slide base over time during the ride; and use the predicted one or more ride output factors to direct and adjust an image displayed on the slide interior corresponding to rider speed and position on the slide.

Slide Shape

The slide may be circular. If circular, the slide may have a roof. Alternatively, the slide may be a "U" shape slide with no roof. Transition in circular to U shape and, optionally, back again may also occur along the intermediate section of the slide.

The slide may be generally circular about the path a rider rides down the slide. In this example, an opening may exist in a wall opposing the path a rider rides down the slide. The opening may open to a wider enclosed or open area. A scene or other lighting effects may be projected or otherwise added to the open area such as on a far wall of the wider enclosed or open area to the rider's path.

The intermediate section of the slide may follow a serpentine path, passing generally downwards from the entrance to the ending.

The ride geometry may be selected from: slide drop, slide curve radius, and slide direction.

The ride prediction software may use Freebody™ analysis to calculate the ride output factors although other software may be used.

Ride Output Factors

The ride output factors may be presented as a graph of time versus force or drawing of slide and rider position or, a table of output data. This may be used to design the slide, describe slide operating conditions e.g. water volume used and, as noted, to time image protection and image movement in concert with the rider's position and speed as they move down the slide.

Image Placement and Form

The image may be displayed on at least part of the wall or the walls and if present, at least part of the roof, of the slide interior. The image may also be projected onto the base of the slide.

The image may be a video. The video may show a scene that the rider is immersed in and travelling through as they move down the slide.

Reference is made herein to one image however; multiple images may be used and reference to a singular image should not be seen as limiting.

Changing Image Perspective

The predicted one or more ride output factors may configure the image to have a changing perspective inside the slide.

The changing perspective may generally match the position of the rider as they move past the image. The changing perspective may generally match the position of the rider's eye as they move past the image.

As noted above, the image displayed may be a moving image or video. The image may be a progressive image that changes as the rider's perspective changes as the rider moves along the slide and past the image.

Reference to changing perspective refers to the way a feature for example grows in size as it is approached and then shrinks once passed and the differing sides of the feature that are viewed. An aim of the slide and image described herein may be to trick the rider into perceiving they are immersed in an artificial world such as a fish tank or a star system.

Further Detection Means

The slide may further comprise at least one detection means configured to identify rider location and speed relative to the image.

The at least one detection means may be used to more precisely match the image to the rider position and speed as the rider passes the image. The at least one detection means may be different or independent to the ride prediction software described above.

Rider position and rider speed may be detected via one or more sensors. The one or more sensors may be located in or about the slide interior. A signal from the one or more sensors may be received by the processor and used with the ride prediction software to confirm or otherwise adjust the image to suit the rider position and speed.

The slide may further comprise at least one detection means configured to detect actual rider speeds and from this detected speed, adjust the image to match the rider speed as the rider passes the image.

The slide may further comprise at least one detection means configured to determine the timing of riders through the slide and to adjust the image to match the timing of each of the riders.

The detection means may be an electronic system or systems. The detection means may be a sensor or sensors.

Slide and Projector

In a second aspect, there is provided a slide comprising a base, walls and optionally, a roof, along with a slide interior and slide exterior, the slide having an entrance, an ending and an intermediate section between the entrance and the ending on which a rider slides and water passing over the slide base and slide walls to urge rider movement from the entrance, through the intermediate section and to the ending of the slide; and a projector configured to display an image on at least part of the slide interior, the image corrected to appear flat when projected by the projector onto the slide interior surface.

Multiple Projectors

The slide may comprise multiple projectors. A single image may be projected by the multiple projectors, the single image being cut into matching segments so that the single image is projected onto one surface from the multiple projectors.

Segmentation like this may allow the production of a realistic image on the round shaped base, wall or roof if present. Segmentation may also be a way to create perspective as the rider moves past the image.

Projector Location

A part of the at least one projector may be located partly inside the slide. In this example, a substantial volume of the projector may be located generally outside the slide interior. The projector may be located partly inside the slide. The projector may be located outside the slide.

The at least one projector may alternatively be located outside the slide and the projector or a part thereof may not penetrate into the slide interior.

The projector may be integrated into the slide base, walls or roof if present.

The projector may be located on the slide exterior.

Where multiple projectors are used, some may be partly in the slide interior and some on the slide exterior.

Housing

The projector(s) may be enclosed in a housing. The housing may be configured to enable close proximity to the slide as well as to protect the projector(s).

The housing may be configured to protect the projector from weather and slide water. The housing may be configured to dissipate heat generated by the projector during use.

In one example, one projector may be enclosed in each housing i.e. one housing has one projector although, one housing could enclosure two or more projectors if desired.

The housing may be configured to enable close proximity to the slide. The housing may be configured to protect the projector(s) therein. The housing may be configured to protect the projector(s) from weather, slide water and to dissipate heat generated by the projector during use.

The housing may further comprise an air conditioning system. The air conditioning system may draw in air and adjust the air temperature to a specific level and then distribute the conditioned air to the projector(s). The air conditioning system may control the temperature of a material separating the projector from water inside the slide e.g. glass or Perspex™ material. The air conditioning system may provide a positive air pressure inside the housing to minimize or prevent chlorine-laden or moist and corrosive air from entering the housing and projector therein.

In summer, the air conditioning system may cool the drawn in air and distribute the cooled air to the projector(s).

In winter, the air conditioning system may either draw air from a warm environment or may heat the air and distribute the heated air to the projector(s).

As noted above, the air conditioning system may also be configured to control the temperature of a material separating the projector from water inside the slide. This may be to minimise or prevent humidity build up on the inside of the material (e.g. glass or Perspex) surface which is exposed to warm humid air/water located in the slide interior.

The air conditioning system may filter air drawn into the air conditioning system. This may occur where there is a risk of potentially damaging air being drawn into the housing via the air conditioning system.

The air conditioning system may be configured to prevent dust or other contaminants such as salt air being exposed to the projector in the housing.

The air conditioning system may be configured to monitor the air temperature and humidity and air flow flowing to the projectors.

The air conditioning system may be configured to monitor the temperature of air in each housing to ensure that each, projector is receiving sufficient air to keep it cool in summer or warn in winter and to ensure that the protective glass does not become covered in humidity.

Shrouds

Shrouds may be located about the slide walls that enable the projected image from the projector to project through the side of the slide.

Image Enhancement

The inside of the slide about a projector lens may be gel coated. The inside of the slide about a projector lens may be painted a white or light colour. This may be completed to enhance the effectiveness of the projection.

Overall System

In a third aspect, there is provided a ride experience comprising:

a slide comprising a base, walls and optionally, a roof, along with a slide interior and slide exterior, the slide having an entrance, an ending and an intermediate section between the entrance and the ending on which a rider slides and water passing over the slide base and slide walls to urge rider movement from the entrance, through the intermediate section and to the ending of the slide; and a processor comprising ride prediction software configured to:
        use inputs selected from at least one or more of: rider weight, rider height, rider to slide friction, water impact factor, slide geometry, and water flow;
        and from the inputs, predict ride output factors comprising one or more of: drag force, friction force, resultant force imposed on the rider during the ride, and rider position on the slide base over time during the ride; and
        use the predicted one or more ride output factors to direct and adjust an image displayed by at least one projector on the slide interior corresponding to rider speed and position on the slide; and/or
        wherein the at least one projector is configured to display an image on at least part of the slide interior, the image corrected to appear flat when projected by the at least one projector onto the slide interior surface.

Slide and LED Loops

In a fourth aspect, there is provided a slide comprising a base, walls and optionally, a roof, along with a slide interior and slide exterior, the slide having an entrance, an ending and an intermediate section between the entrance and the ending on which a rider slides and water passing over the slide base and slide walls to urge rider movement from the entrance, through the intermediate section and to the ending of the slide; and at least one LED strip lighting loop, each loop configured to fit around a slide exterior and project LED light into the slide interior.

Multiple Loops

The slide may comprise multiple LED strip lighting loop. The multiple LED strip lighting loop may be spaced apart along a length of slide.

The multiple LED strip lighting loop may be located at regular or varying spacings.

When used in this way with multiple loops, lighting effects can be achieved to immerse the rider in light and through varying the light, change the ride experience.

Loop

The term 'loop' is used to refer to a circular shaped strip of LED lighting. In this specification, the loop referred to need not be whole or make a full circle. The loop may for example have an arc shape. The arc shape may extend only about a wall or walls or the slide. The arc may extend only about a base of the slide. The arc may only extend about a roof if used, of the slide. Combinations of arcs about the slide base, wall or walls and roof if present may be used as well.

Light Control

The LEDs of the LED strip light loop may be configured to be controlled to light according to a desired characteristic. The desired characteristic may be selected from: colour, brightness, varying brightness, on/off switching, and combinations thereof.

Light Location

The LED strip lighting loop may be a strip of LED lights in series. The LED strip lighting loop may be fastened to the slide exterior.

Light Mounting

An area of slide about which the LED strip lighting loop is fastened may comprise a transparent or translucent section of slide base, walls or optionally, roof. Light generated by LED's in the LED strip lighting loop may pass through the transparent or translucent section of slide base, walls or optionally, roof.

The at least one LED strip lighting loop may be housed in an external housing. The external housing may be located on or about the slide exterior.

The slide base, walls and optionally, roof may be configured to minimise or prevent ambient sun light or building lighting from entering the slide interior. The external housing may be configured to also act to prevent ambient sun light or building lighting from entering the slide interior about the LED strip lighting loop.

The external housing is designed to hold the LED strip lighting loop sufficiently away from the translucent strip on the surface of the slide, so as to provide the desired lighting effect. The LED strip lighting loop external housing may for example, be made from fibreglass or have a fibreglass cover that may be white coloured to deflect ambient heat and which may be sufficiently thick to prevent ambient light passing through the cover. The LED strip lighting loop may also have a soft seal around the loop perimeter to aid in stopping the suns light entering.

Heat Sink

Each LED strip lighting loop, or selected LED strip lighting loops may comprise a heat sink. The heat sink may be configured to disperse heat generated from the LEDs. A heat sink may be achieved by the external housing having a thin fin shape with a relatively large surface area. Heat reflecting material may also be used to absorb heat away from the LED's or reflect ambient heat away from the LED strip lighting loop as well.

Slide and LED Spot Lighting

In a fifth aspect, there is provided a slide comprising a base, walls and optionally, a roof, along with a slide interior and slide exterior, the slide having an entrance, an ending and an intermediate section between the entrance and the ending on which a rider slides and water passing over the slide base and slide walls to urge rider movement from the entrance, through the intermediate section and to the ending of the slide; and LED spot lights configured to spot light the slide interior, the or each LED spot light comprising a prefabricated assembly configured to be fitted to a ring cut into the slide wall, or optionally roof, from the slide interior.

Assembly

The LED spot light and prefabricated assembly may be fitted into the slide wall, or roof if present, by threading the LED spot light prefabricated assembly into the ring from the slide interior.

Light Control

The LED of the LED spot light may be configured to be controlled to light according to a desired characteristic selected from: colour, brightness, varying brightness, on/off switching.

Lens

The LED spot lights and/or prefabricated assembly may comprise a lens. The lens may be partially obscured via an obscuring means to create images in the slide interior once the LED spot light is fitted to the slide and illuminated.

The obscuring means may be applied and removed from the slide interior.

Prefabricated Assembly

The prefabricated assembly may be configured to keep ambient sun light or building lighting from entering the slide interior.

The prefabricated assembly may be configured to hold the LED of the LED spot light sufficiently far away from the slide base, wall, or optionally roof, so as to provide the desired lighting effect. The LED spot lights may have a cover that inhibits sunlight penetrating the prefabricated assembly and slide interior.

The prefabricated assembly may be designed to keep ambient sunlight or other ambient lighting from entering the slide interior. The prefabricated assembly may comprise a white exterior to reflect ambient heat from the LED spot light.

Heat Sink

Each LED spot light, or selected LED spot lights may comprise a heat sink. The heat sink may be configured to disperse heat generated from the LEDs.

Advantages

As may be appreciated from the above description, the slide and ride system provides a number of advantages such as but not limited one or more of the following:

Provision of the rider with a sense of movement and immersion;

The images displayed in the slide interior may change in reference and perspective as the rider moves down the slide;

Image movement is achieved from the rider's perspective to create the sense of illusion of immersion in the displayed imagery;

Image projection adapts an image to look 3 dimensional on the circular slide interior;

The projectors may reliably be located in challenging environments exposed to the environment, heat, water, dust, corrosive sea air and may have temperature regulation;

LED lighting may be provided that does not interfere with the slide interior ride surface and shields the slide interior for sun light and heat from the sun;

The LED lighting may be configured to interact and respond to the movement of the rider or riders through the slide;

The intensity of the image or LED lighting may be controlled to adjust the level of intensity of the images or flashing. This may be useful to cater for the needs of riders or suit a theme or time of day for example.

LED lighting may be accessed from the slide interior for servicing and installation.

The embodiments described above may also be said broadly to consist in the parts, elements and features referred to or indicated in the specification of the application, individually or collectively, and any or all combinations of any two or more said parts, elements or features.

Further, where specific integers are mentioned herein which have known equivalents in the art to which the embodiments relate, such known equivalents are deemed to be incorporated herein as if individually set forth.

WORKING EXAMPLES

The above described slide and ride system are now described by reference to specific examples and item numbering below:

10 Transparent or translucent slide surface area
12 Rock
14 Slide walls
16 Slide roof
18 Slide base
22 Projectors
24 Slide interior wall
30 Scene
32 Upper shroud
35 Housing 36 Lower base
38 Air conditioning system
40 Slide
42 Inlet pipe
44 Housing outlet
50 Slide exterior
52 LED loops
60 Segmented images
62 Sensor beam
64 Sensor
66 LED strips
70 Slide volume
72 Plant room
74 Starter area
76 Slide area
110 LED spot light
112 Spotlight ring
120, 220 Slide section bend
200 Serpentine slide
212 LED loop section
222 Slide bend
224 Projections
$X_1$, $Y_1$ Slide entry
$X_2$, $Y_2$ Slide exit

Example 1

As noted above, the slide described herein may use ride/slide analysis software to predict rider output characteristics.

This software uses Freebody™ analysis to calculate the rider speed, position and the forces on the body although other software packages may be used.

The rider inputs provided to the processor and software produces outputs to predict rider position over time and hence can predict rider movement relative to the slide and image(s) therein.

The rider prediction software may take account the following data:

Rider weight and size;
Rider to slide friction and water impact factor;
Slide form data (e.g. drop, curve radius and direction).

The rider prediction software may then calculate the speed/volume of water down the slide.

Once this has been calculated the rider prediction software may then be able to calculate the impact of gravity and the slide form as well as the force of the water on the rider to determine the rider line and speed.

Tables 1 and 2 below show typical inputs that may be used in the above analysis:

TABLE 1

| Property | Value | Unit |
|---|---|---|
| Number of Sections | 33 | — |
| Rider Mass | 140 | kg |
| Rider Width | 45 | cm |
| Longitudinal Friction Coefficient | 0.0855 | — |
| Launch Velocity | 2 | m/s |
| Flow Rate | 55 | L/s |
| Slide Diameter | 1.2 | m |
| Bow Wave Depth (BWD) | 1.5 | m/m |
| Lateral Friction Coefficient | 0.063 | — |
| Hanmer Green v18 | 0 | — |
| Fastest rider | 0 | — |

TABLE 2

| Flange ID | Length [m] | Drop [mm] | Radius [m] | Turn [L/R/S] |
|---|---|---|---|---|
| 1 | 1.35 | 500 | 0 | S |
| 2 | 1.047198 | 356.46 | 22.65432 | L |
| 3 | 1.047198 | 416.55 | 3.482571 | L |
| 4 | 0.863938 | 176.09 | 5.5 | L |
| 5 | 2.159845 | 462.09 | 5.5 | L |
| 6 | 1.570796 | 332.25 | 4 | L |
| 7 | 2.356194 | 404.28 | 3 | L |
| 8 | 1.570796 | 188.05 | 2 | L |
| 9 | 1.570796 | 199.05 | 2 | L |
| 10 | 1.570796 | 225.39 | 2 | L |
| 11 | 1.570796 | 150.07 | 2 | L |
| 12 | 1.570796 | 139.56 | 2 | L |
| 13 | 1.570796 | 189.91 | 2 | L |
| 14 | 1.570796 | 169.65 | 2 | L |
| 15 | 1.570796 | 151.67 | 2 | L |
| 16 | 1.570796 | 156.79 | 2 | L |
| 17 | 2.356194 | 242.46 | 3 | L |
| 18 | 2.356194 | 275.52 | 3 | L |
| 19 | 1.570796 | 211.25 | 4 | L |
| 20 | 1.570796 | 224.29 | 4 | L |
| 21 | 1.570796 | 218.98 | 4 | L |

FIG. 1 shows a typical output graph illustrating the predicted forces, rider position, rider speed, based on time/location on the slide.

Figure 2:
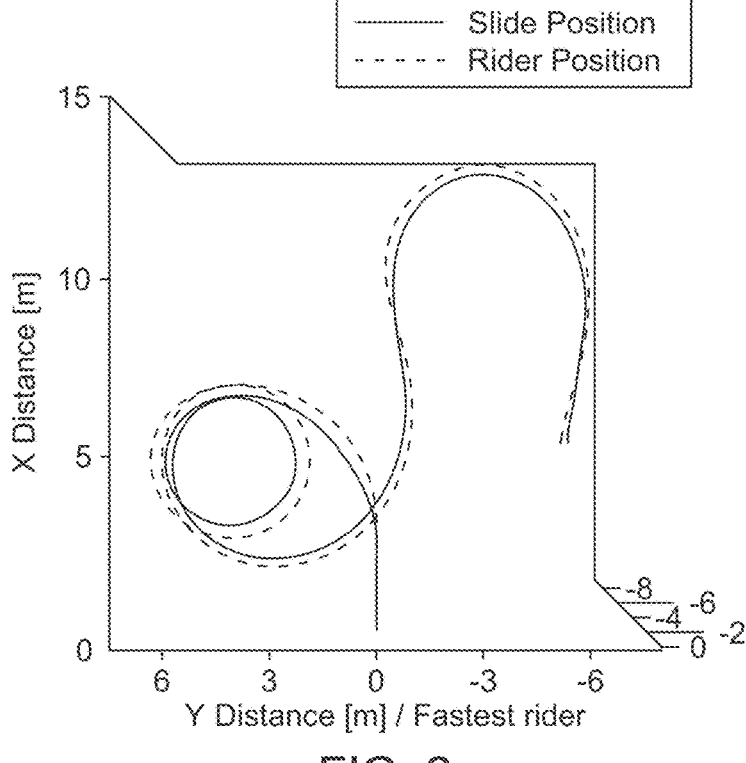
FIG. 2 shows a typical output image illustrating rider position relative to a slide position (slide base and how the rider tends to slide up a slide wall as they corner under greater force)

FIG. 2 shows a typical output image illustrating rider position relative to a slide position (slide base) and how the rider tends to slide up a slide wall as they corner under greater force.

The ride analysis is needed to be able to configure the video images so that they create perspective inside the slide that matches the rider eye as they pass through a fictional world displayed by the image(s).

Figure 3:
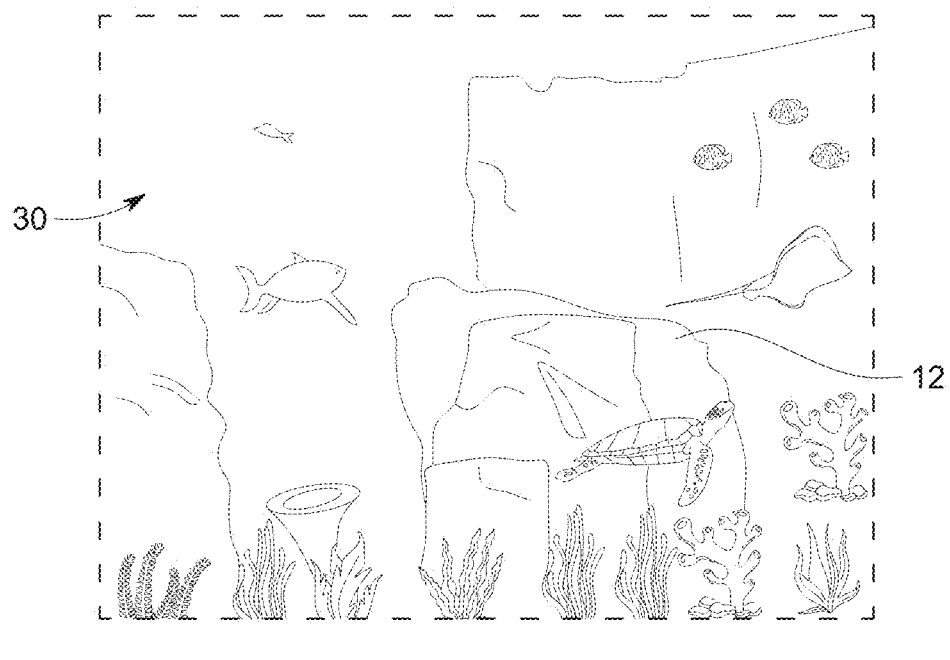
FIG. 3 and FIG. 4 illustrate how, in an underwater scene, rocks shown vary in perspective as the rider moves past the rocks and the speed of this change in respect of a full 3D world needs to match the riders speed in order for the word to appear real.
Figure 4:
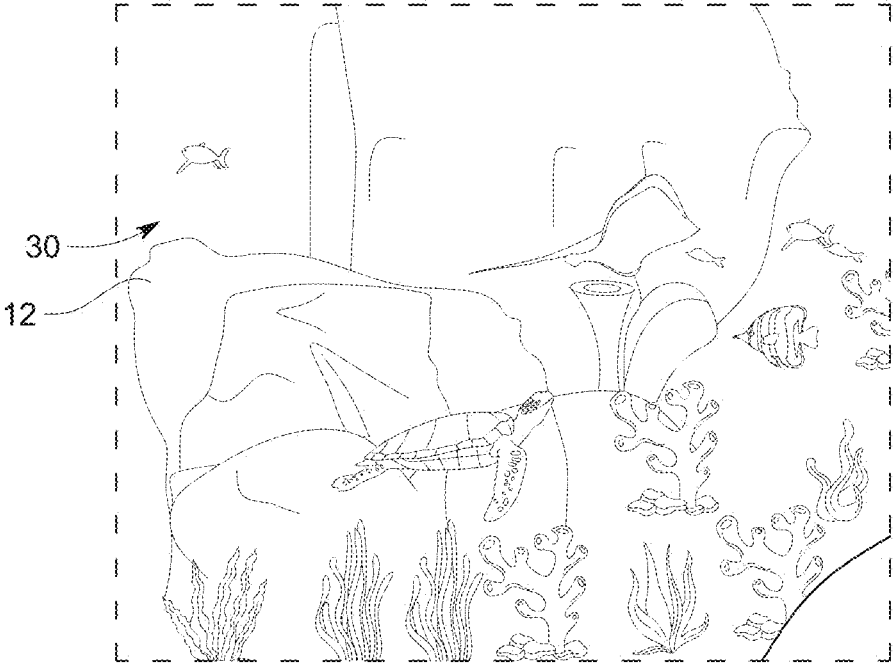

FIG. 3 and FIG. 4 illustrate how, in an underwater scene 30, a rock 12 shown may vary in perspective as the rider (not shown) moves past the rock 12 from a rider first position (FIG. 3) to a rider second position (FIG. 4). The speed of this change in respect of a full 3D scene 30 world needs to match the riders' speed in order for the scene 30 to appear real.

Example 2

Figure 5:
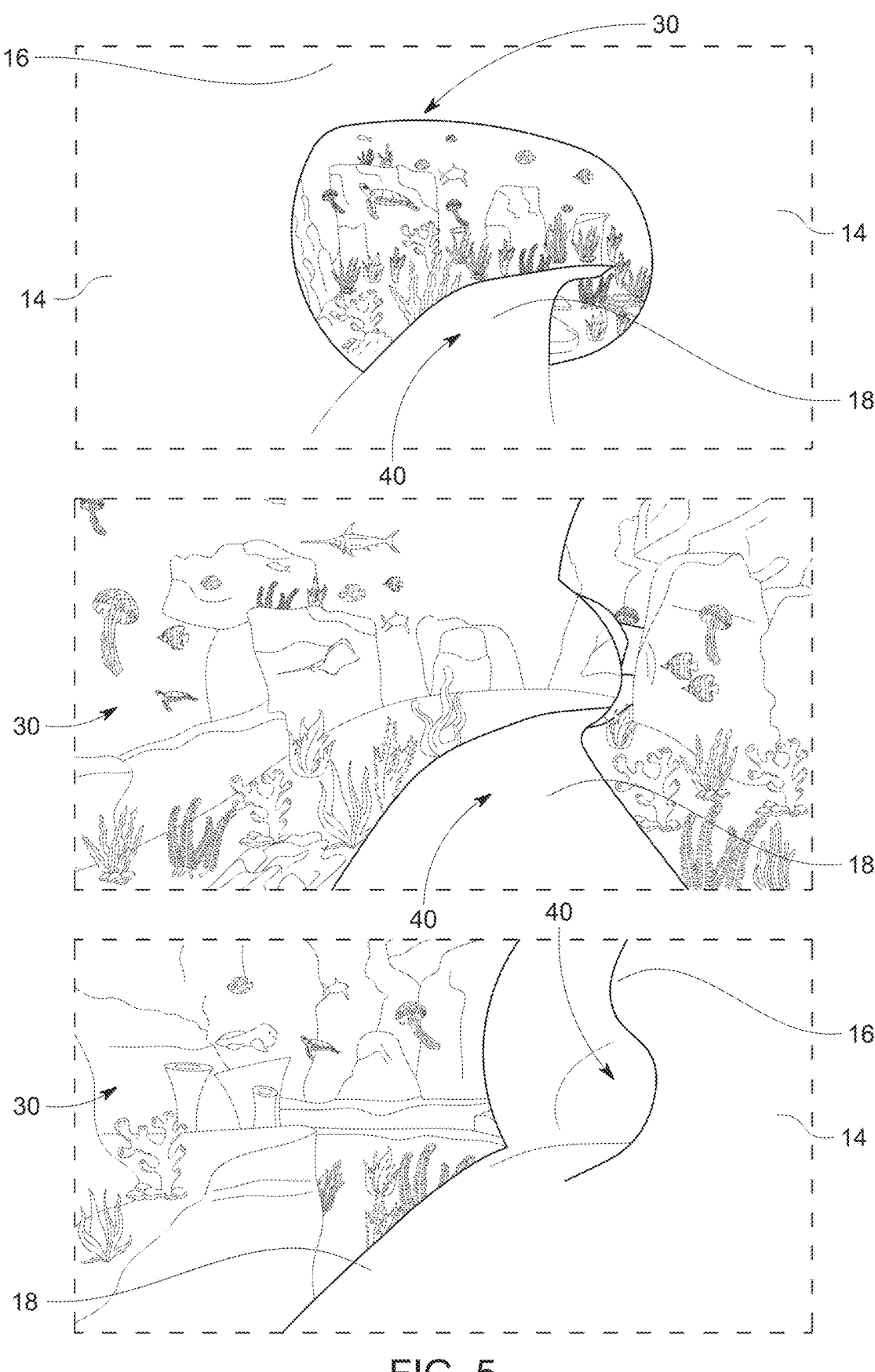
FIG. 5 shows a series of snips from such a scene, with the slide in white and the rider approaching the scene, passing through the scene and then leaving the scene.

Once the slide 40 has been designed, then a scene 30 may be designed around the slide 40 using 3D CAD tools. FIG. 5 shows a series of images from such a scene 30, with the slide 40 in white and the rider approaching the scene 30, passing through the scene 30 and then leaving the scene 30. As shown in FIG. 5, the riders' view is shown as they move towards the scene 30 (top) image, passing through the scene 30 (middle image) and exiting the scene 30 (bottom image). The slide 40 comprises a base 18, side walls 14 and a roof 16.

The scene 30 can have animated objects such as fish or monsters created in it that move as the rider is moving, with the ability to have these objects approach or move away from the rider as they move along the slide 40.

Once the scene 30 is created software may be used to paste onto the side of the slide 40 interior an image or images of what the naked eye would see as it rides down the slide 40 in a 'real' world. This may be a progressive image that changes as the rider's perspective changes as they move down the slide 40 through the scene 30.

Once this has been completed, the images then have to be corrected so that they appear flat when projected onto the curved slide surface 24 and then cut into matching segments

60 so they can be projected onto one surface 24 from a series of different projectors 22 that are located down the slide 40.

The projectors 22 are described further below.

Figure 7:
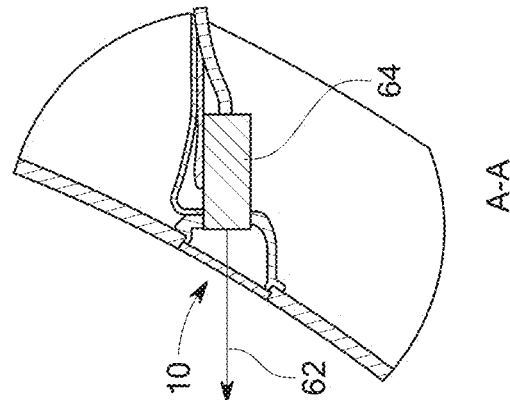
FIG. 7 shows the projector positioning in more detail.
Figure 7:
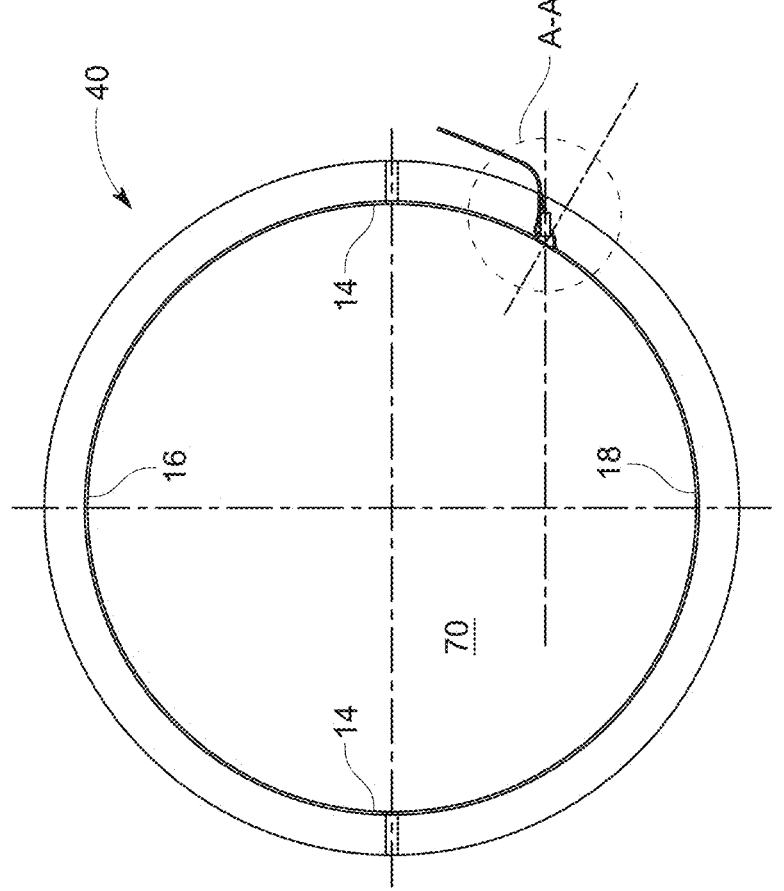

FIG. 7 shows the use of a sensor 64 and positioning of this sensor 64 in the slide 40 volume 70. The sensor 64 may be the detection means described above in this case using an optical beam 62 that is broken when a rider moves past the sensor 64 beam 62. This sensor 64 provides additional information to the processor and ride prediction software on rider location and speed. This extra information may be used to further improve the image accuracy as perceived by the rider. The sensor 64 may be positioned outside the slide 40 and against a transparent or translucent surface 10.

Example 3

As noted elsewhere, images may be projected onto the slide 40 interior 24 such as on the walls 14, base 18 or roof 16. Because the slide 40 is not a flat 2-dimensional surface, the projected images 60 must be corrected so that they appear flat when projected onto the curved slide surface 24 and then cut into matching segments 60 so they can be projected onto one surface 24 from a series of different projectors 22 that are located down the slide 40.

Figure 6:
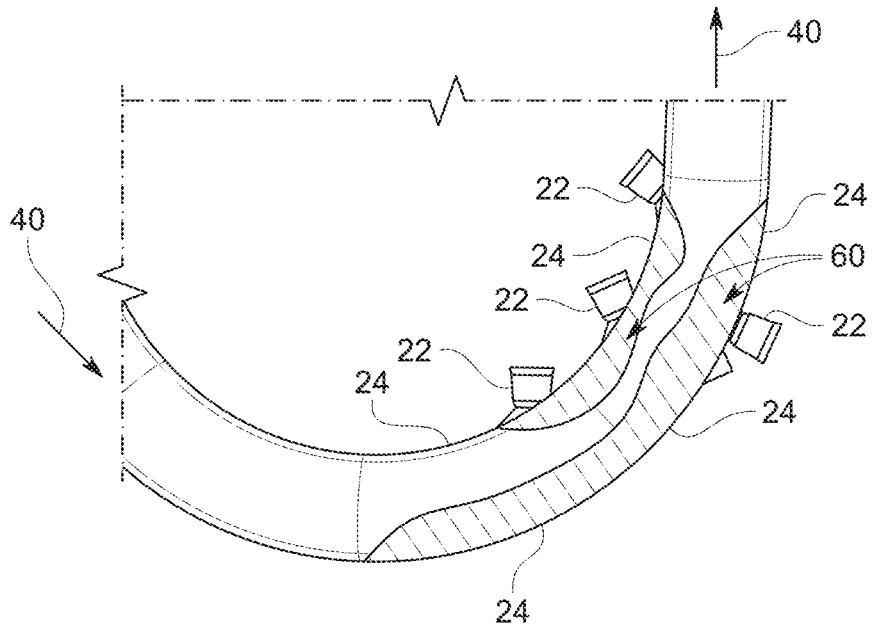
FIG. 6 is an image of where the projectors are that will create the scene above.

FIG. 6 is an image of where the projectors 22 may be located to project segmented images 60 to create the scene 30 on the slide interior 24.

The projectors 22 may be housed partly inside the slide 40 in some cases and external in others. They may be enclosed in a special enclosure that enables the proximity to the slide 40 body as well as the protects the projectors 22 from harm from the weather as well as from the heat. The projectors may produce considerable heat when they operate and they are exposed to the sun on hot days or to frost on cold days. It may also be necessary to ensure that the projector 22 glass does not fog up, particularly on cold days or in the evenings.

The inside 24 or a part of the inside of the slide 40 may also be gel coated or repainted a white or light colour to enhance the effectiveness of the projected images 60.

The projector 22 and housing 35 includes an air conditioning system 38 that draws in air and cools it or warms it to a specific temperature and then distributes it the projectors 22. In summer the cooler is working to its capacity in the freezing months of winter the air is drawn from a warm environment or if this is not available the air must be heated. The air is also filtered using a charcoal filter. The projector 22 housing 35 temperature must be monitored so that the glass over the projector 22 lens is above the dew point temper of the warm moist air inside the slide, so that the glass or plastic window does not have humidity forming on it.

The air provides not only temperature control but also a positive air pressure inside the housing 35 so that no chlorine-laden or moist and corrosive air can enter the projector 22 area. It also prevents dust or any other contaminants such as salt air, if the installation is near to the sea or is a dust prone environment.

The air conditioning system 38 monitors the air temperature and humidity and air flow flowing to the projectors 22 to ensure that the projector 22 manufacturers' environmental requirements are met and can be recorded. The system 38 also monitors the temperature of the air in each housing 35 to ensure that each projector 22 is getting sufficient air and it operating as desired by the manufacturer.

Figure 8:
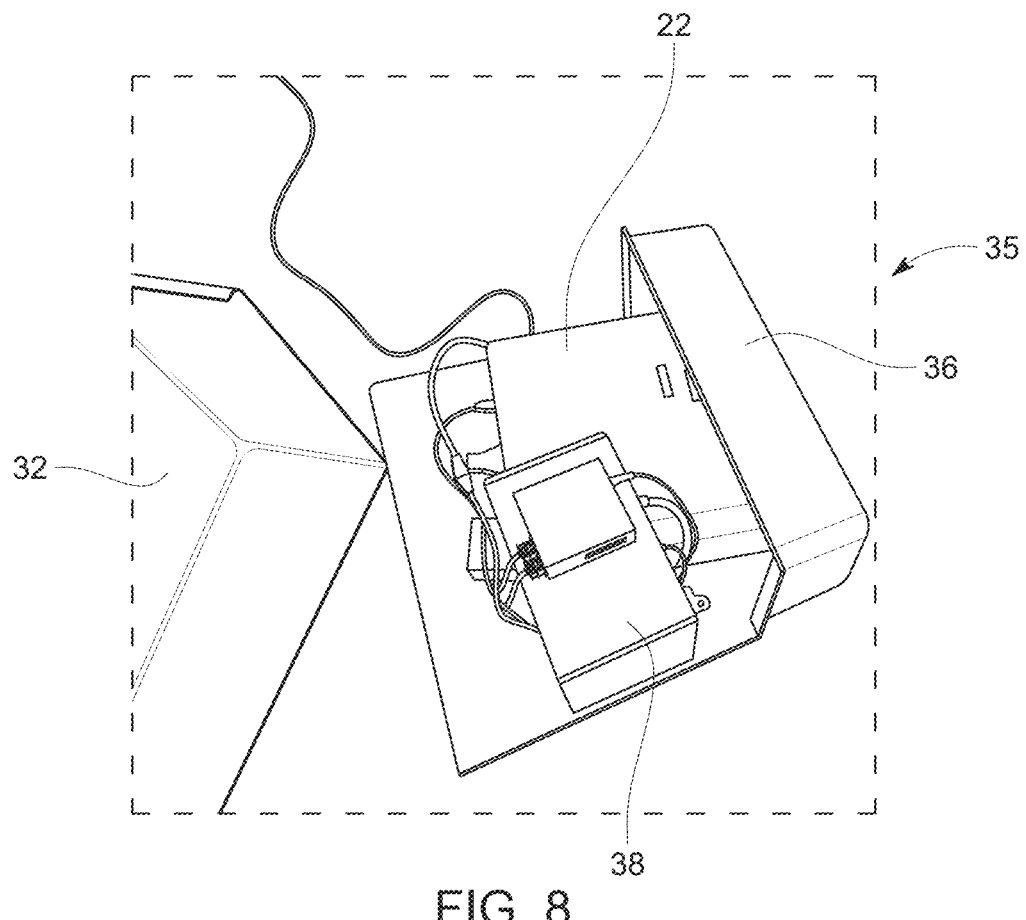
FIG. 8 and FIG. 9 are photos of a typical housing and a list of drawings sent separately.
Figure 9:
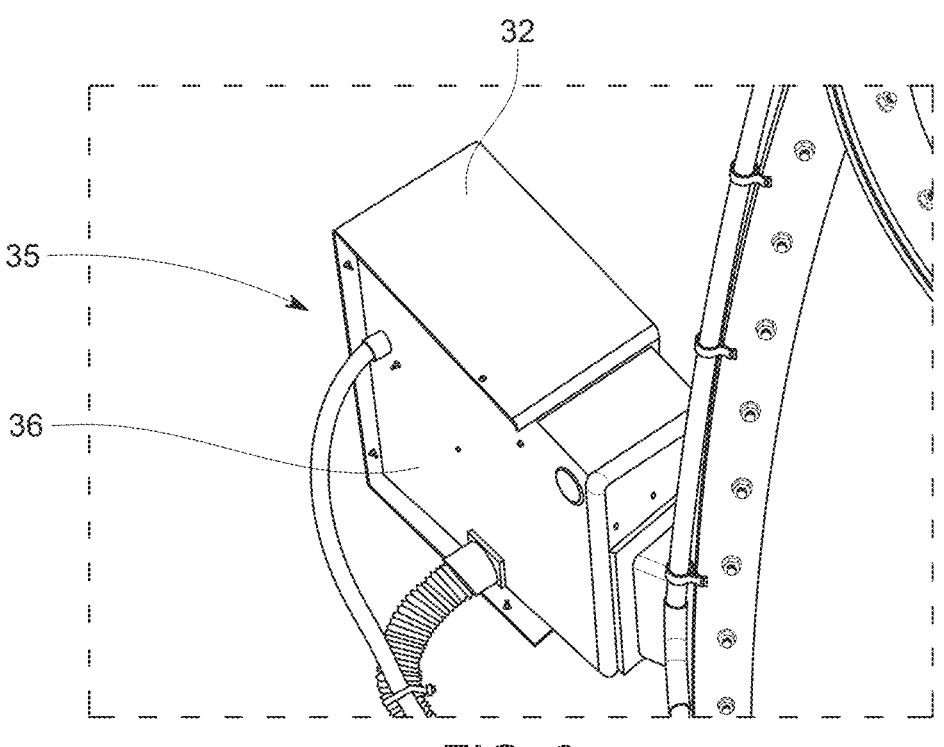

FIG. 8 and FIG. 9 are photos of a typical housing 35 and projector 22, the housing 35 comprising an upper shroud 32 and lower base 36. The housing 35 also contains the air conditioning system 38. The air conditioning system 38 and housing 35 also use shrouds that enable the projection to come through the side 24 of the slide 40.

Figure 10:
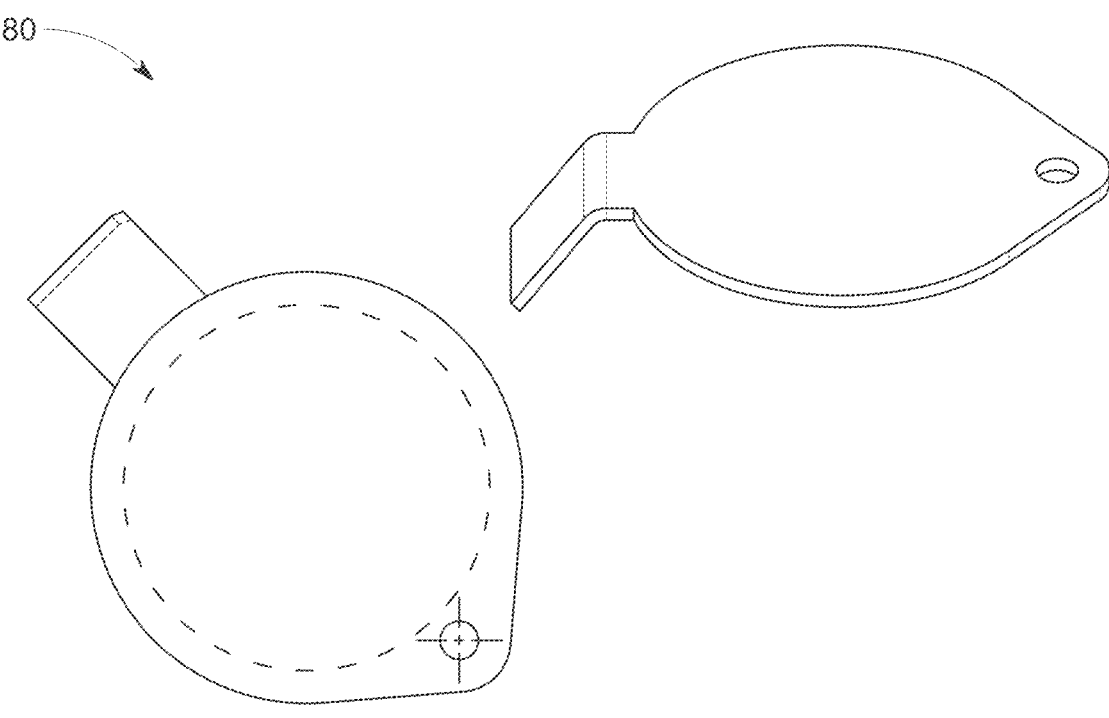
FIG. 10 shows different views of a vent adjustable restrictor for a projector housing.

FIG. 10 shows different views of a vent adjustable restrictor 80 for a projector 22 housing 35. The vent adjustable restrictor 80 acts as a flap to allow air to escape the housing 35 but which helps seal the housing 35 in the event of low or no air flow through the housing 35.

Figure 11:
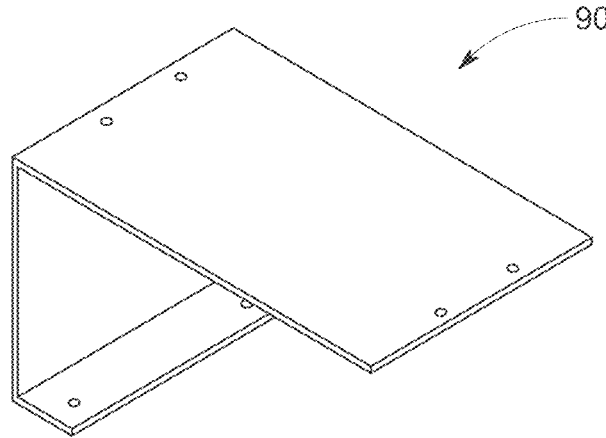
FIG. 11 shows different views of an example of a projector housing mount.

FIG. 11 shows an example perspective view of a projector housing mount 90. This may be used to couple the housing 35 and slide 40.

Figure 12:
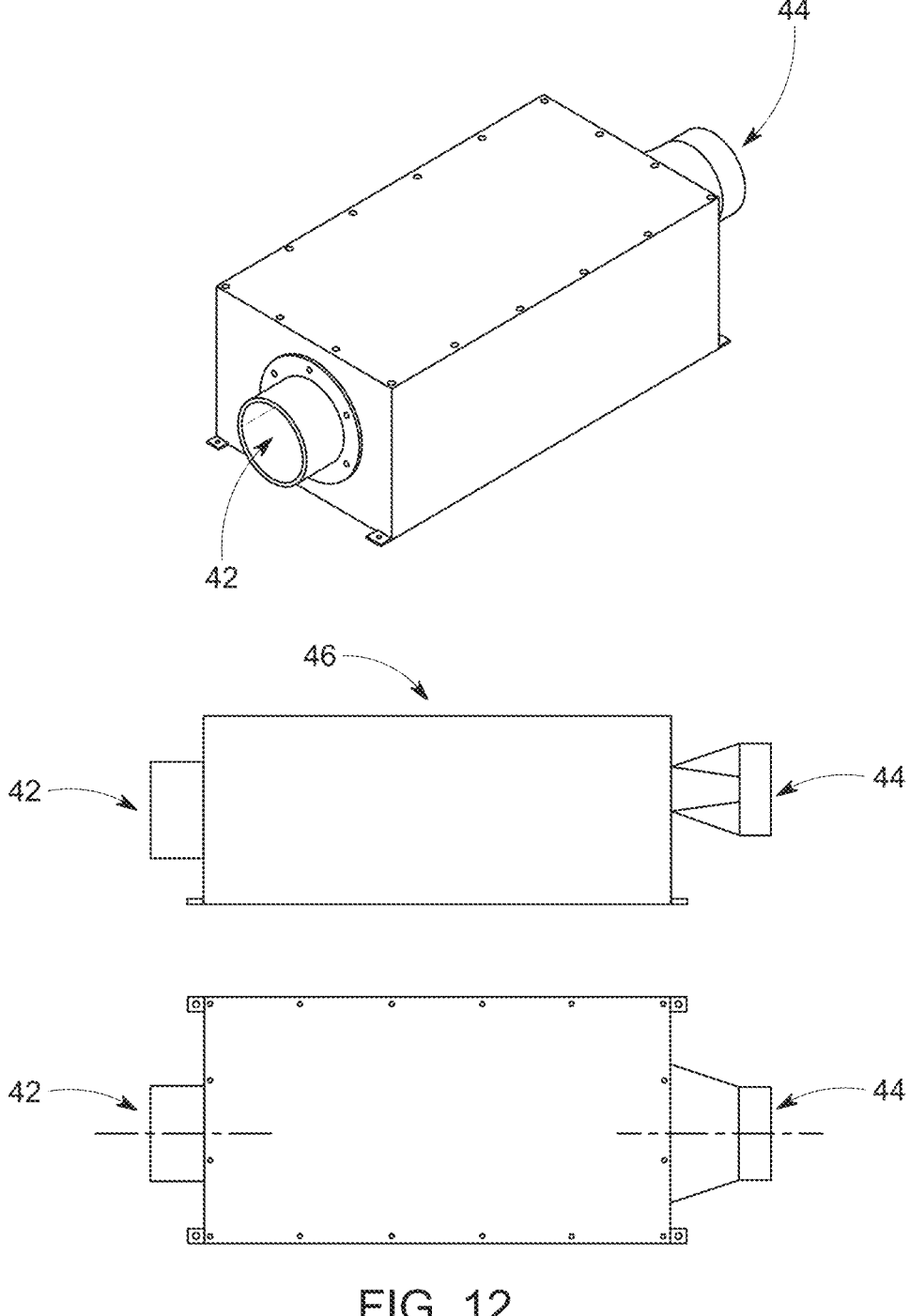
FIG. 12 shows different views of a projector housing in an assembled form.

FIG. 12 shows different views of a projector 22 housing 35 in an assembled form with a housing outlet 44 and inlet pipe 42.

Figure 13:
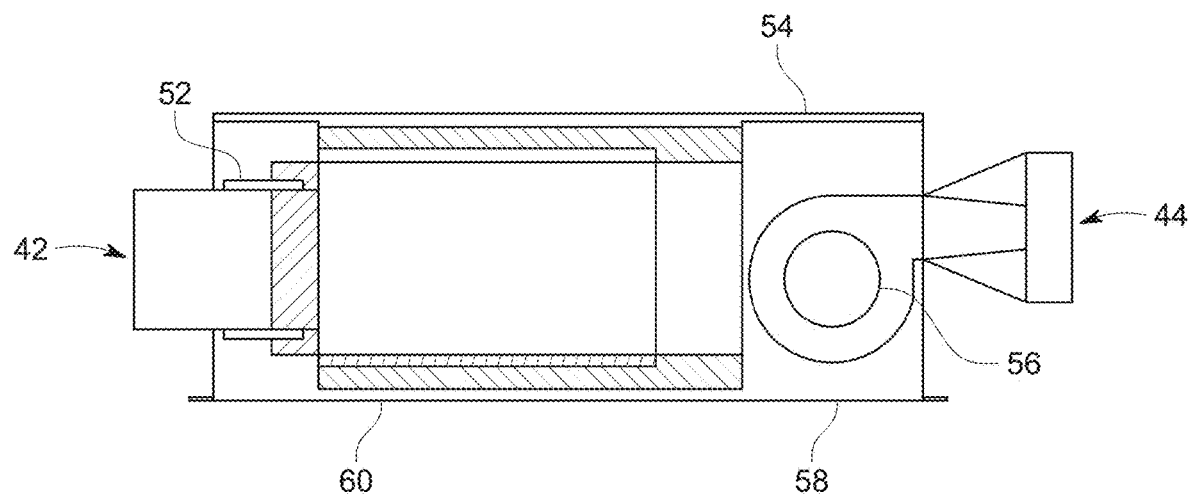
FIG. 13 shows different section views of the housing with a roof panel removed.

FIG. 13 shows different section views of the housing 35 with a roof panel removed.

Figure 14:
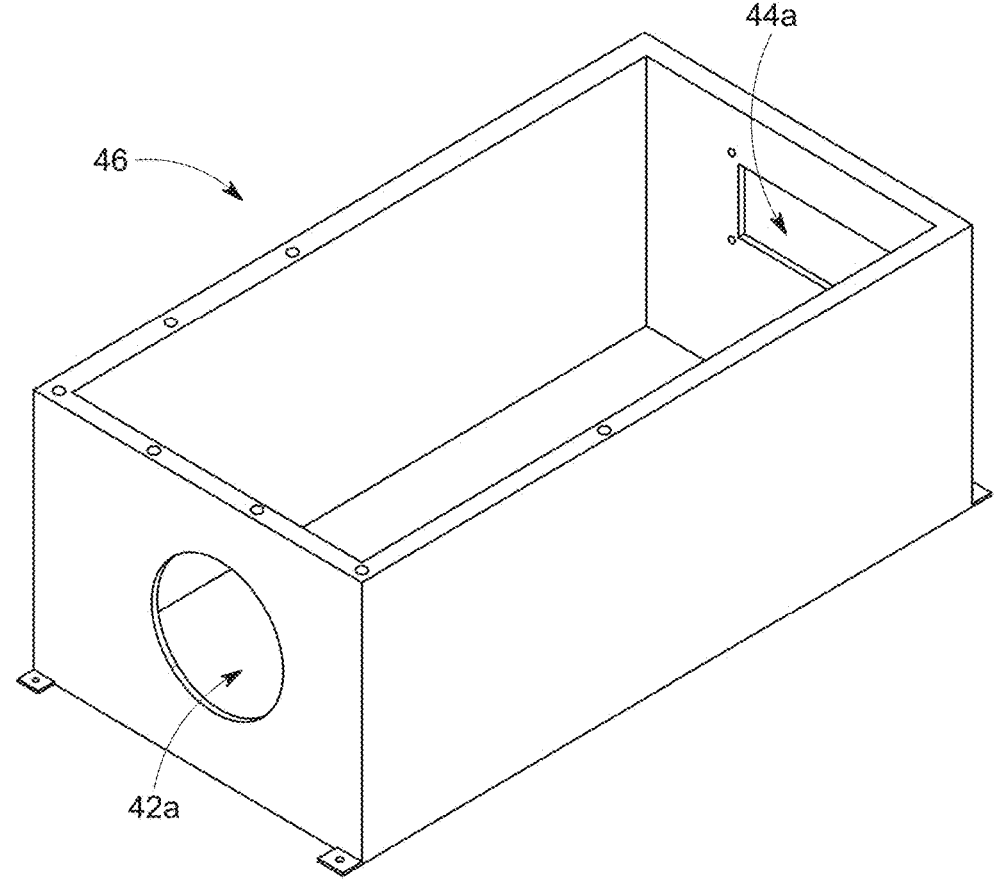
FIG. 14 shows different views of the housing with the projector and roof panel removed.

FIG. 14 shows different views of the housing 35 with the projector 22 and roof panel removed.

Figure 15:
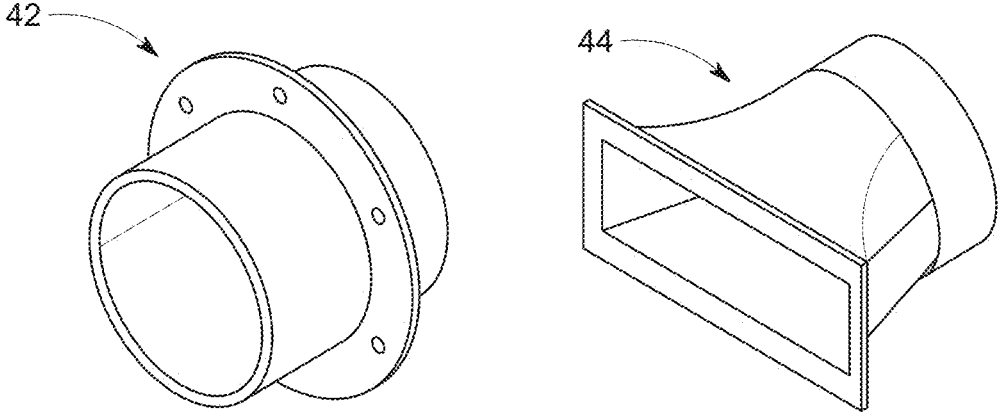
FIG. 15 shows different views of the housing outlet transition and an inlet pipe or mount flange.

FIG. 15 shows different views of the housing outlet 44 and an inlet pipe 42.

Figure 16:
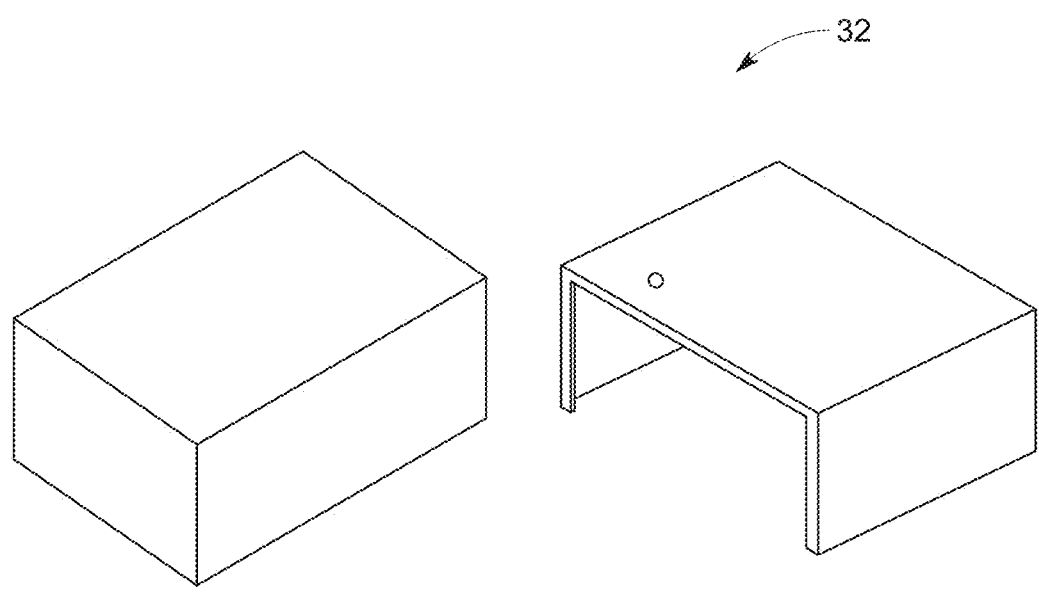
FIG. 16 shows different views of a shroud that fits over the projector housing.

FIG. 16 shows different views of an upper shroud 32 that fits over the projector housing 35.

Figure 17:
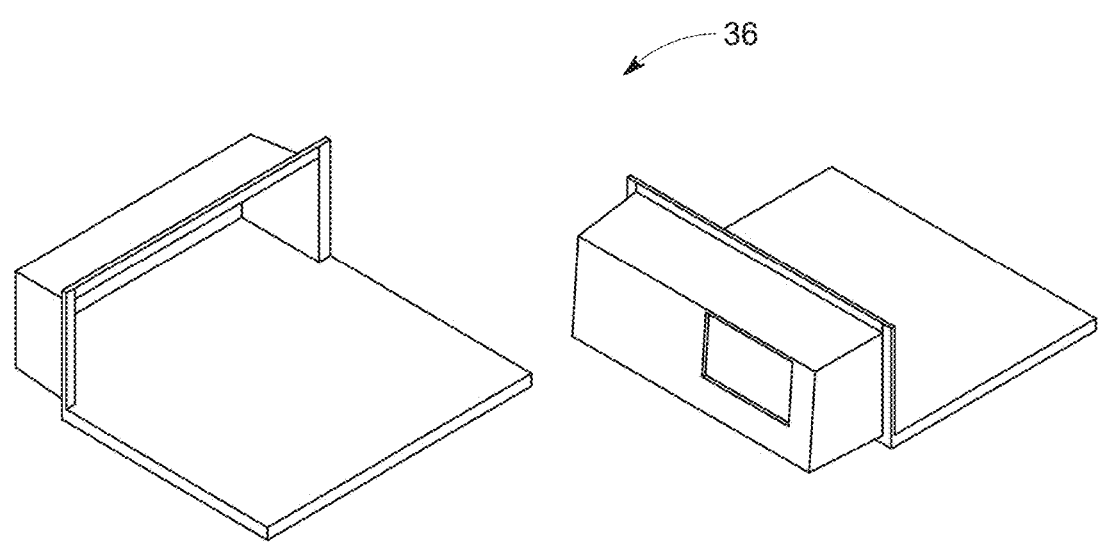
FIG. 17 shows different views of an alternative shroud.

FIG. 17 shows different views of a lower base 36 on which the projector 22 is seated.

Example 4

The slide 40 may comprise LED loops 52. These are specially designed loops 52 that fit around the slide 40 to shield the sun's light and to house LED strips 66. LED's on the surface of the slide are not ideal as they create a pixelated look. The inventors identified that a superior effect may be produced by fitting the LED strip 66 lighting loops 52 into a housing 64 on the slide exterior 50 and projecting the light through the slide 40.

Special software can be used to create any number of effects form the LED loops 52, from placid effects to the effect of the rider traveling at slow or fast speeds or of rotating inside the slide 40.

Figure 18:
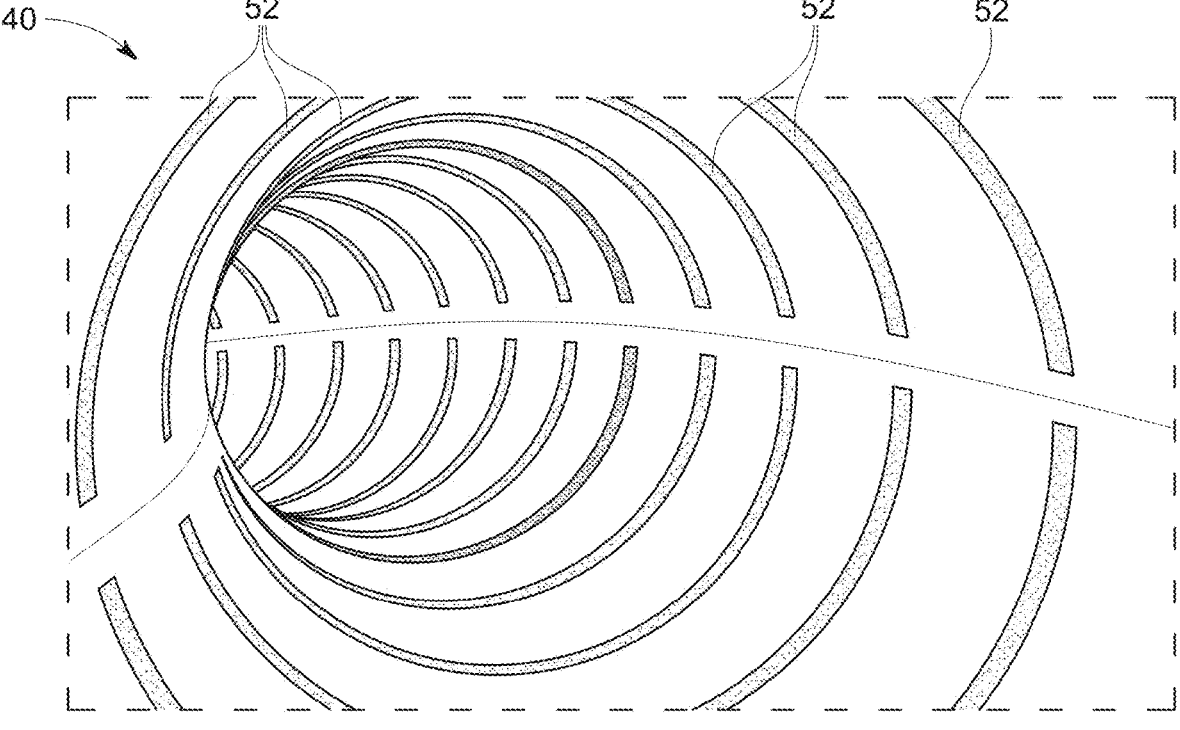
FIG. 18 shows an example of the LED loop lighting effect.

FIG. 18 shows an example of the LED loop 52 lighting effect. Loops are shown extending along the slide interior. Each loop 52 as shown circles the slide 40 circumference.

Figure 19:
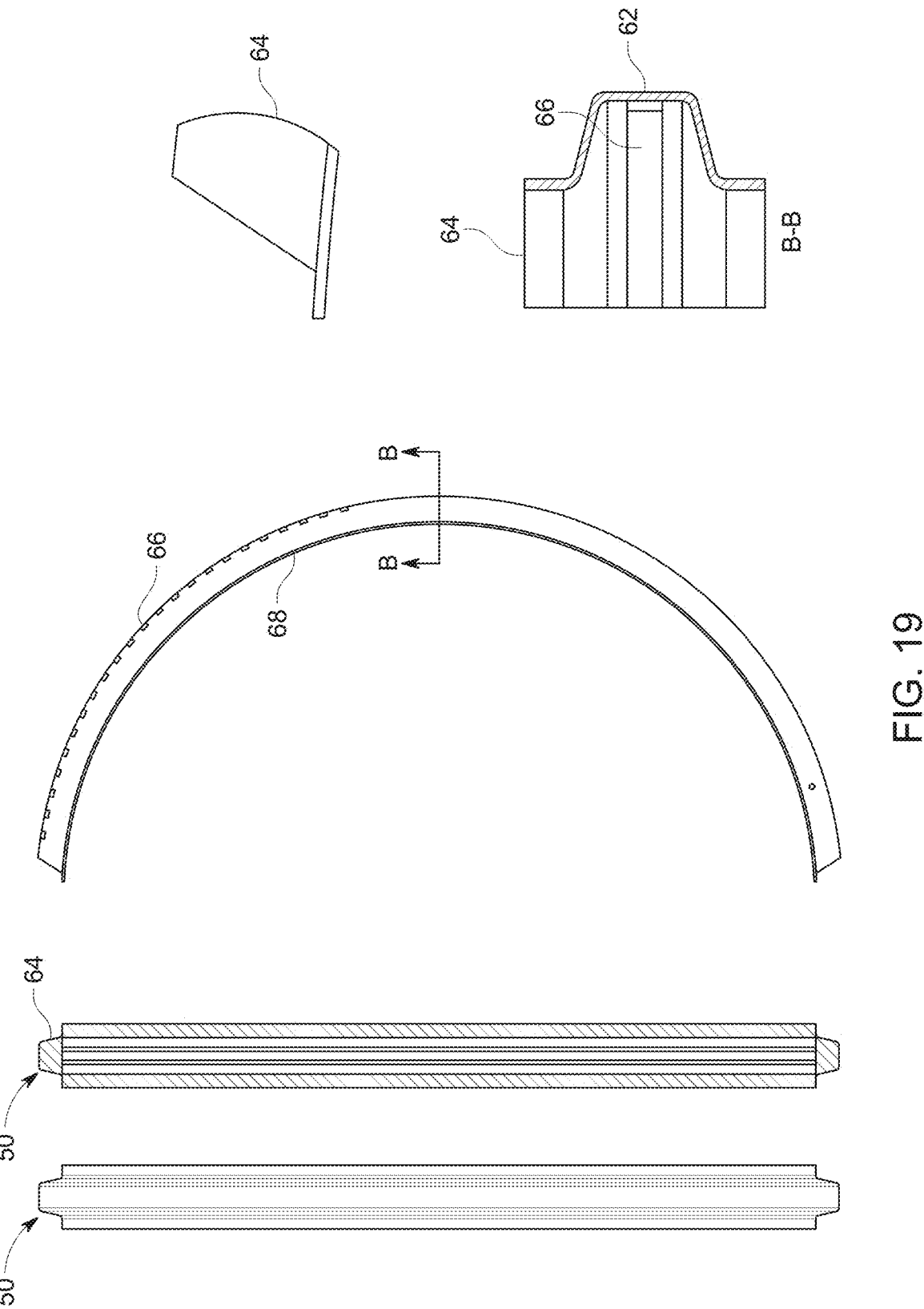
FIG. 19 shows varying views of an LED loop arrangement and interaction with a slide wall.

FIG. 19 shows varying views of an LED loop 52 arrangement and interaction with a slide 40 wall. The LED strip 52 is fastened to the slide exterior 50 in a mount 66. The mount 66 is fin shaped to dissipate heat and may incorporate aluminium to absorb heat through conduction away from the LED lights 66. The slide interior 68 about the strip loop 52 may be translucent and may be gel coated about the LED strip lighting loops 52.

Example 5

The slide 30 may comprise LED spot lights 110. The LED spot lights 110 used may have a prefabricated assembly that allows the LED spot light 110 and parts to be maintained from inside the slide 40. The slide exterior is typically at height and thus expensive to access for maintenance. Internal fitting and removal is achieved by cutting a ring 112 into the slide 40 wall volume 70 and then screwing the LED spot light 110 into the ring 112 from inside the slide 40 volume 70.

The LED spot lights 110 may be controlled by special software that can create a range of effects inside the slide 40. The LED spot light 110 can be covered by fish outlines or any other forms to create images inside the slide 40. These forms can easily be changed from inside the slide 40.

Figures 20, 21:
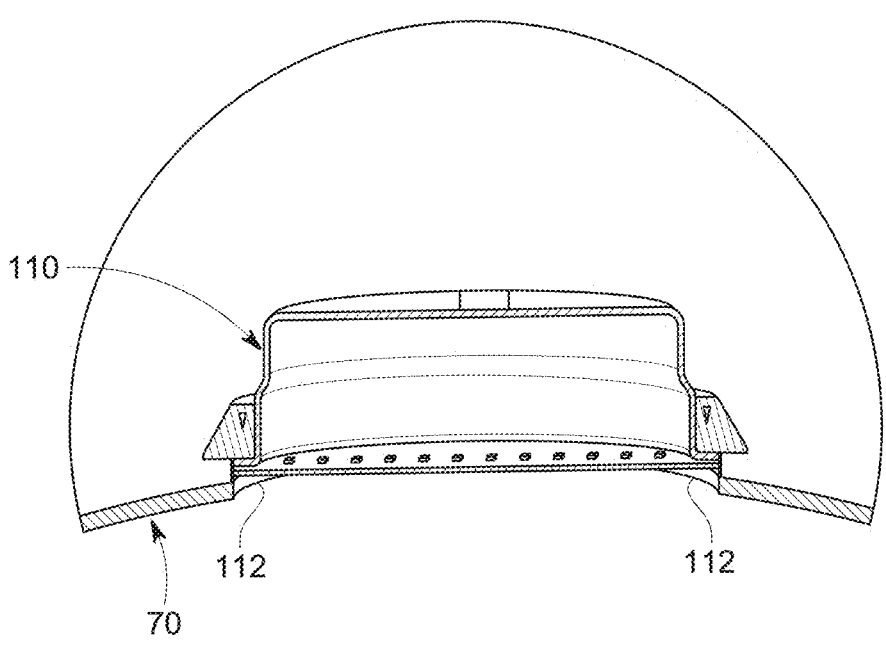
FIG. 20 shows a side section view of an example of LED spot light and prefabricated assembly when positioned in a slide roof.
FIG. 21 shows a different views of an example of LED spot light and prefabricated assembly when positioned in a slide roof.

FIG. 20 shows a side section view of an example of LED spot light 110 and prefabricated assembly when positioned in a slide 4—such as a slide roof 16.

FIG. 21 shows a different views of an example of LED spot light 110 and prefabricated assembly when positioned in a slide roof 16.

Example 6

In this example, an overall ride system is described with reference to FIG. 22 that shows a diagram of an example of a full overall ride system using the various elements described herein.

Figure 22:
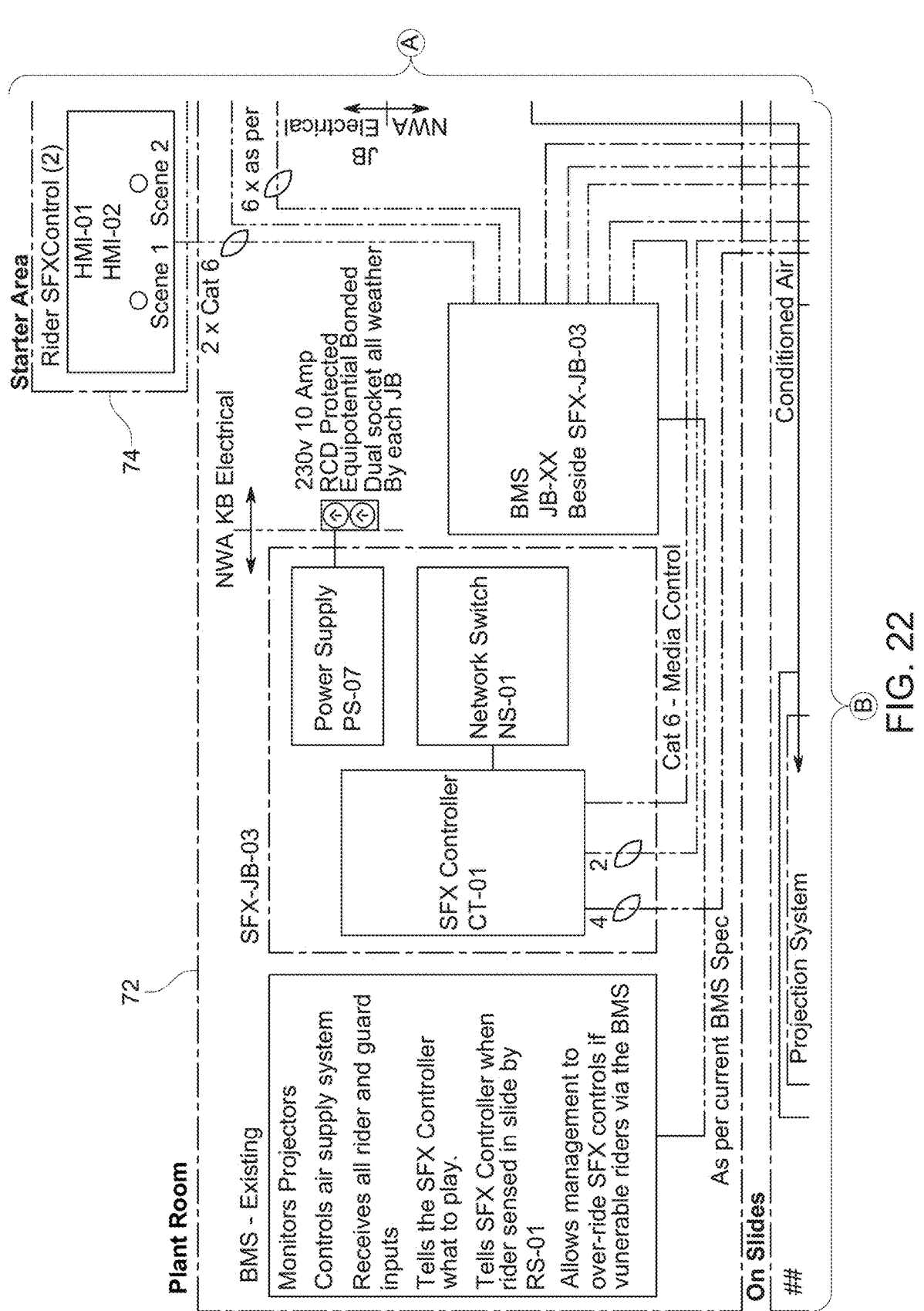
FIG. 22 shows a diagram of an example of a full overall ride system using the various elements described herein.
Figure 22:
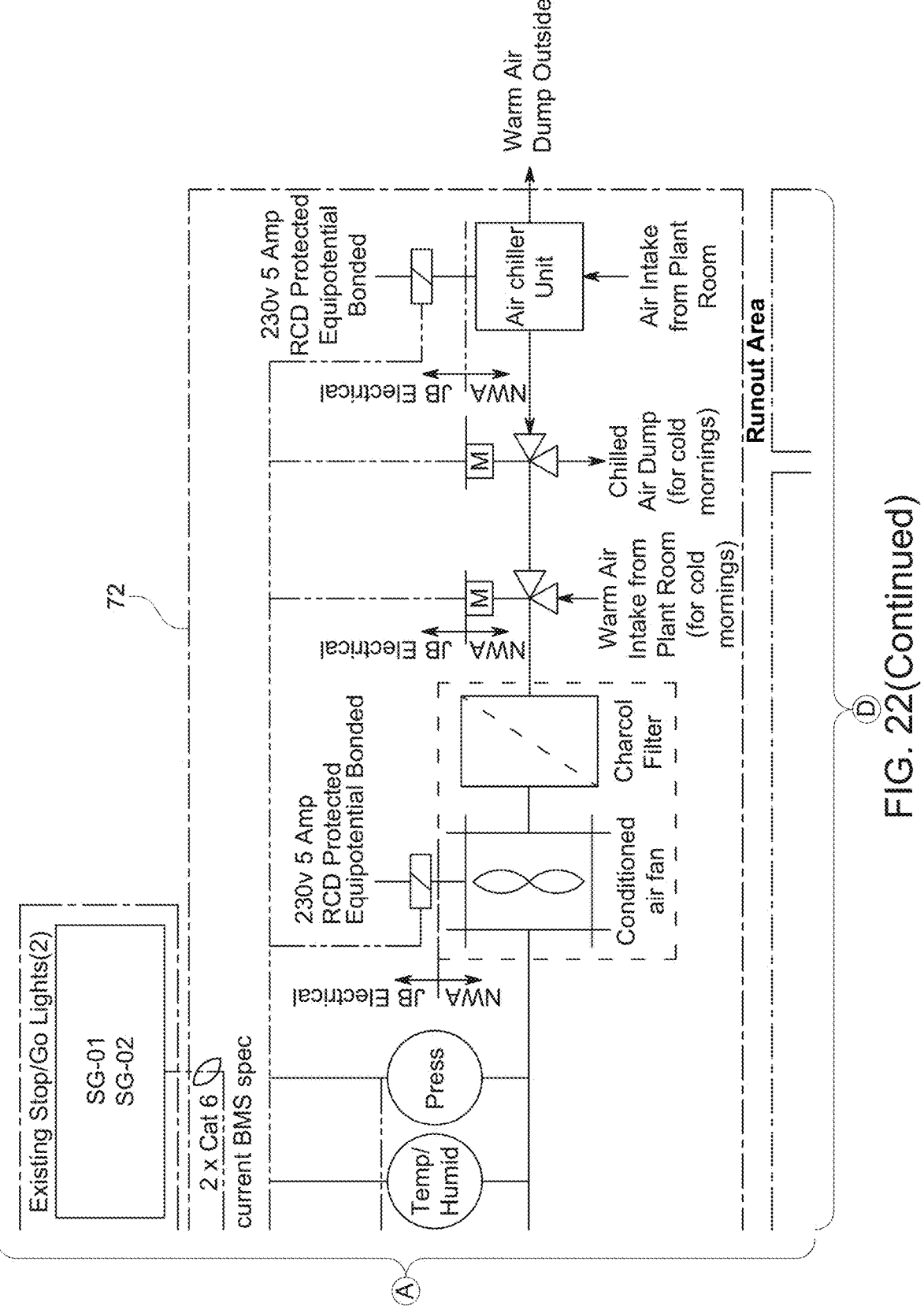
Figure 22:
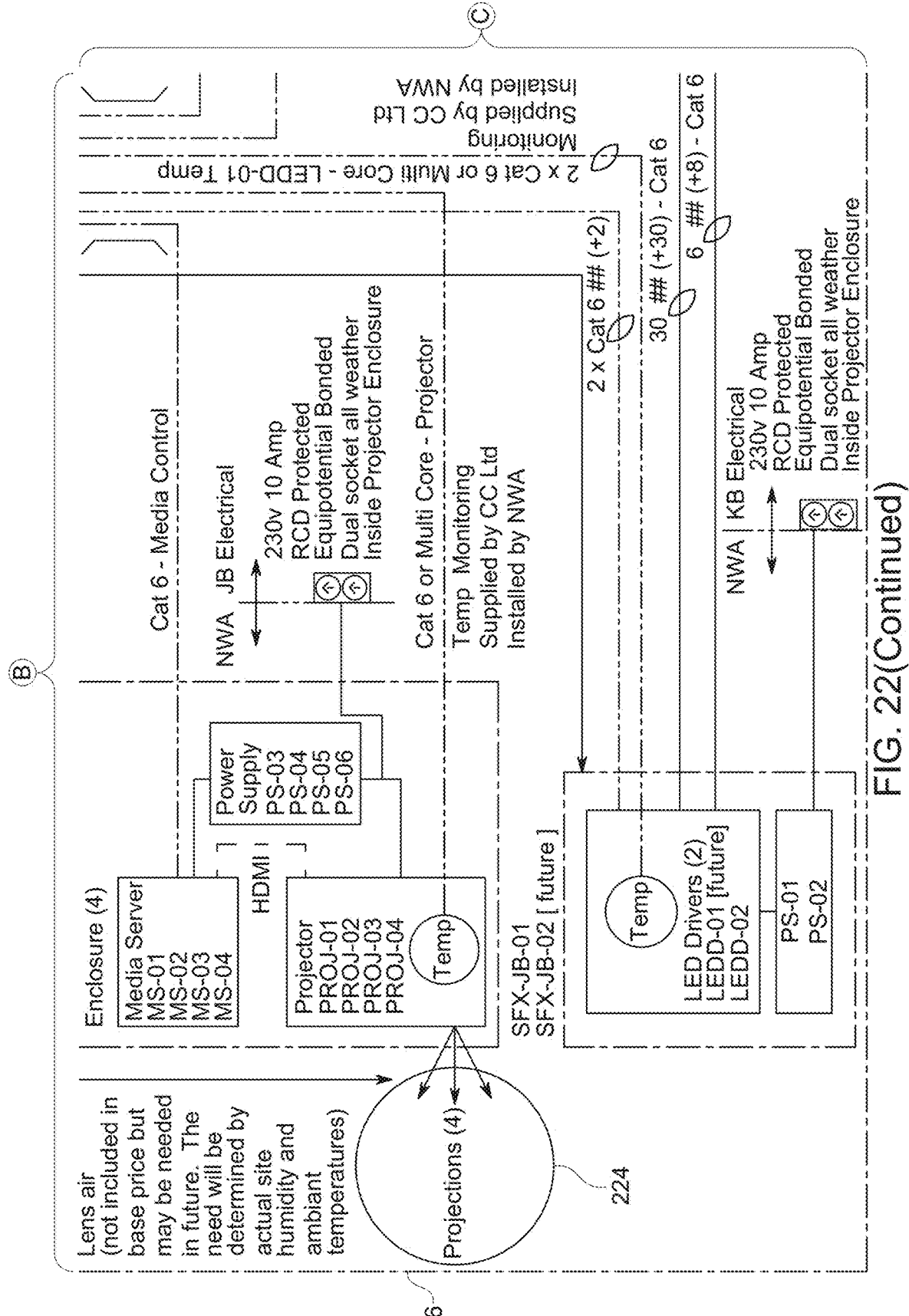
Figure 22:
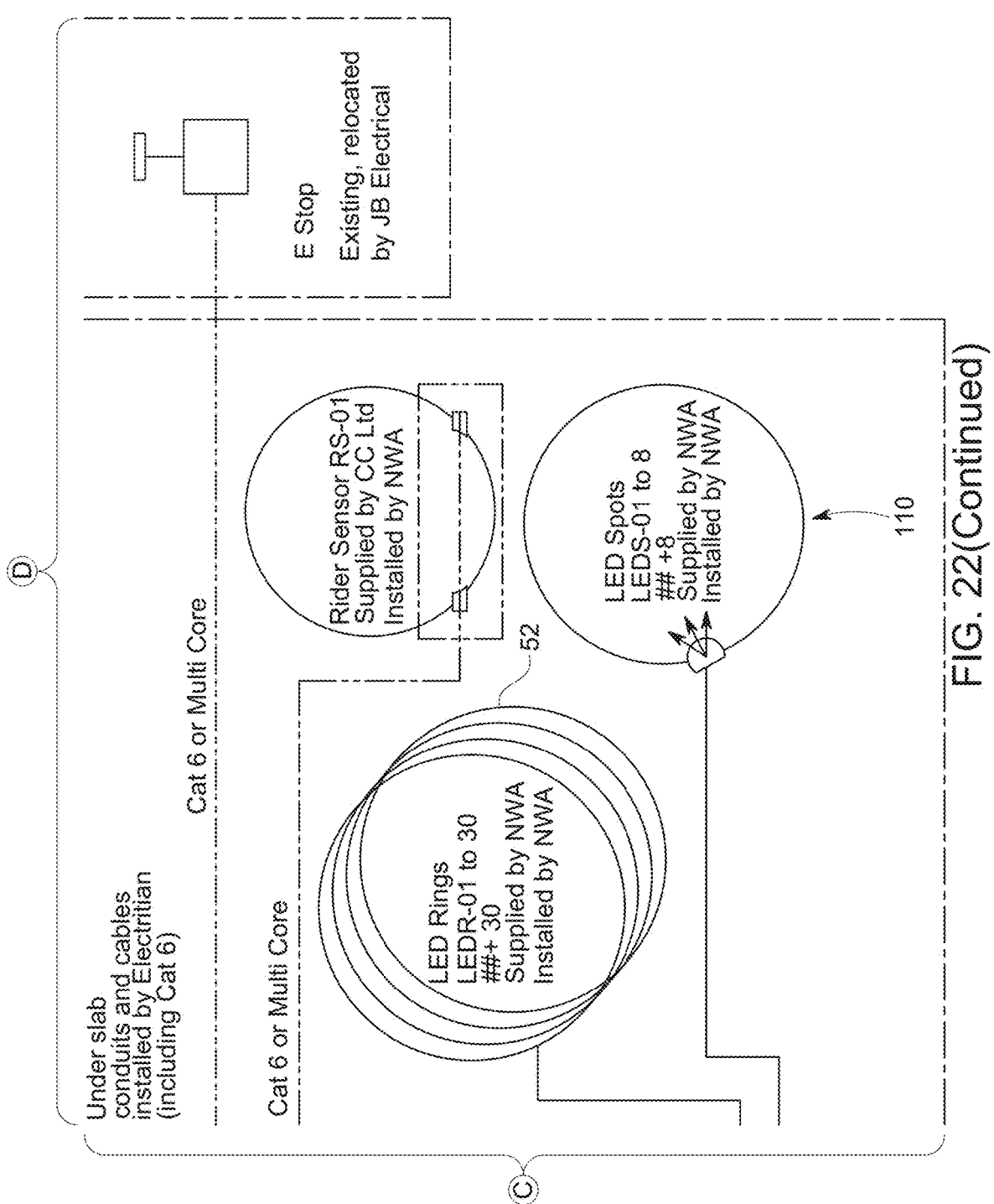

FIG. 22 shows how the various sensors, rider input buttons/switches and the various control systems work together to form a fully integrated ride system. The ride system may be automated so that when the slide owner turns the slides on, all of the controllers and projectors and LED's and various sensors start working in an automated way. Alternatively, the ride system can be turned on or off manually in part or in full. The system of FIG. 22 comprises a starter area 74, plant room 72, on slide area 76 which comprises the projections 224 and LED loops 52 and LED spot lights 110.

Once turned on, slide riders are able to press a button at the entrance to the slide they are about to ride that tells the control system which scene they want to experience, for example using buttons labelled accordingly. This system may be designed so the rider can choose a scene that is less intimidating or a scene that is less stroboscopic for example.

In more detail, the ride system may be programmed to allow riders to select from a range of pre-programmed scenes, or may be programmed to allow riders to select "Calm", or "Wow" if they wish to experience associated scenes 30 or LED lighting effects form the LED loops 52 or the LED spotlights 110.

A central control system instructs the red and green, "STOP/GO" lights when to flash red and thus when the riders are to go.

The central control system may also control the media servers and LED drivers, instructing them on what scene to play. Coordinating all of the various LED's 52, 110 and projectors 22 and any other sound or other sensual features as the rider descends the slide 40.

Figure 23:
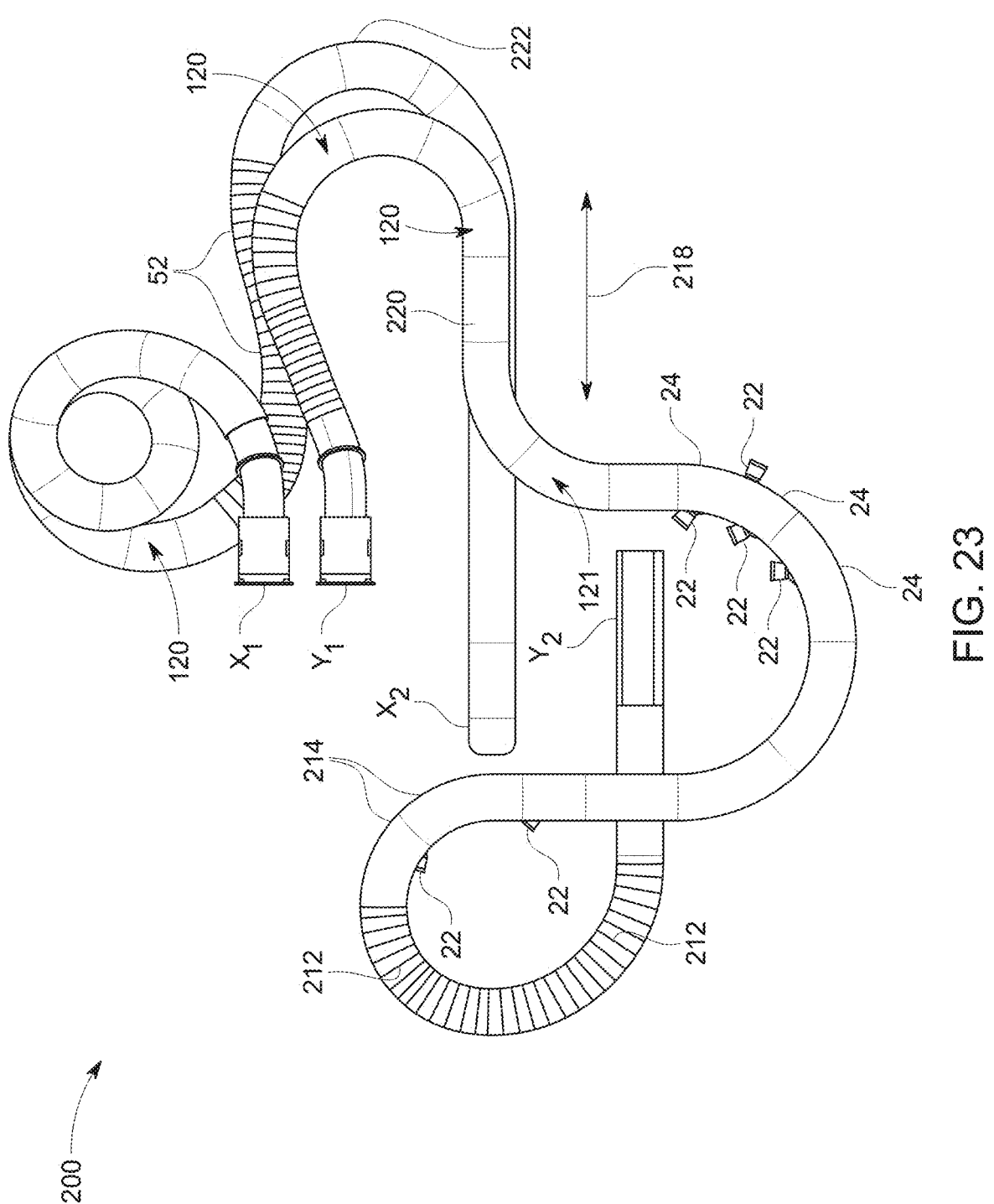
FIG. 23 shows a serpentine slide from above and locations of various elements described herein relative to the slide itself.

FIG. 23 shows a serpentine slide 200 from above and locations of various elements described herein relative to the slide 200 itself. The rider enters either slide 200 via the entry $X_1$, $Y_1$. For ride $X_1$ as shown, the rider spins down section 120, through LED loops 52, around bend 222 and to exit $X_2$. For ride $Y_1$, the rider passes through LED loops 52, around bend 120, along section 220 and bend 120, past projectors 22 and scene 30 on the walls 24 and through the LED loops 212 and the exit $Y_2$.

Aspects of the slide and ride system have been described by way of example only and it should be appreciated that modifications and additions may be made thereto without departing from the scope of the claims herein.

What is claimed is:

1. A slide comprising a base and walls, along with a slide interior and slide exterior, the slide having an entrance, an ending and an intermediate section between the entrance and the ending on which a rider slides and water passing over the slide base and slide walls to urge rider movement from the entrance, through the intermediate section and to the ending of the slide; and a processor comprising ride prediction software configured to:

use inputs related to the rider or the slide;

and from the inputs, predict ride output factors related to the movement of the rider on the slide; and use the predicted one or more ride output factors to direct and adjust an image displayed on the slide interior corresponding to rider velocity and position on the slide, the image being a progressive image that changes as the rider's perspective changes as the rider moves through the slide and past the image, the changing perspective generally matching the position of the rider's eyes as the rider slides past the image.

2. The slide as claimed in claim 1 wherein the image is displayed on at least part of a wall or the walls of the slide interior.

3. The slide as claimed in claim 1 wherein the slide further comprises at least one detection means configured to identify rider location and speed relative to the image, the at least one detection means used to more precisely match the image to the rider position and speed as the rider passes the image.

4. The slide as claimed in claim 1 further comprising:

at least one LED strip lighting loop, each LED strip lighting loop configured to fit around a slide exterior and project LED light into the slide interior.

5. The slide as claimed in claim 4 wherein an area of slide about which the LED strip lighting loop is fastened comprises a transparent or translucent section of slide base, or walls that light generated by the LED strip lighting loop passes through.

6. The slide as claimed in claim 4 wherein the at least one LED strip lighting loop is housed in an external housing, the external housing located on or about the slide exterior.

7. The slide as claimed in claim 1 further comprising:

LED spot lights configured to spot light the slide interior, the or each LED spot light comprising a prefabricated assembly configured to be fitted to a ring cut into the slide wall or roof from the slide interior.

8. The slide as claimed in claim 7 wherein the prefabricated assembly is configured to:

keep ambient sun light or building lighting from entering the slide interior; and to hold the LEDs of the LED strip light, or the LED of the LED spot light sufficiently far away from the slide base or wall so as to provide the desired lighting effect.

9. The slide as claimed in claim 7 wherein the LEDs of the LED strip light, or the LED of the LED spot light are configured to be controlled to light according to a desired characteristic selected from: colour, brightness, varying brightness, on/off switching.

10. The slide as claimed in claim 1 wherein the slide geometry is selected from: slide drop, slide curve radius, and slide direction.

11. The slide as claimed in claim 1 wherein the ride output factors are presented as: a graph of time versus force, a drawing of slide and rider position, a table of output data.

12. The slide as claimed in claim 2 wherein the image is also projected onto the base of the slide.

13. The slide as claimed in claim 1 wherein the image is a video, the video showing a scene that the rider is immersed in and travelling through as they move down the slide.

14. The slide as claimed in claim 1 wherein the slide further comprises at least one detection means configured to determine the timing of riders through the slide and to adjust the image to match the timing of each of the riders.

15. The slide as claimed in claim 1, wherein the slide further comprises a roof.

16. The slide as claimed in claim 2, wherein the slide further comprises a roof and the image is displayed on at least part of the roof of the slide interior.

17. The slide as claimed in claim 4 wherein the slide further comprises a roof and, the area of slide about which the LED strip lighting loop is fastened comprises a transparent or translucent section of slide roof that light generated by the LED strip lighting loop passes through.

18. The slide as claimed in claim 8 wherein the slide further comprises a roof and wherein the prefabricated assembly is further configured to hold the LEDs of the LED strip light, or the LED of the LED spot light sufficiently far away from the slide roof so as to provide the desired lighting effect.

19. The slide as claimed in claim 1 wherein, the image is corrected so that the image appears flat when projected onto a curved slide surface; and further wherein, the image is cut into matching segments so each image segment can be projected onto one surface from a series of different projectors that are located down the slide.

20. The slide as claimed in claim 1 wherein, the slide comprises one or more sensors configured to provide additional inputs related to the rider and/or the slide to the processor, the one or more sensors being positioned in the slide interior that the rider passes, wherein the one or more sensors are further configured to detect the rider passing.

\* \* \* \* \*